US012637236B2

(12) United States Patent
Howe et al.

(10) Patent No.: US 12,637,236 B2
(45) Date of Patent: May 26, 2026

(54) ThermaSat SOLAR THERMAL PROPULSION SYSTEM

(71) Applicant: ThermaSat Inc., Scottsdale, AZ (US)

(72) Inventors: Troy Michael Howe, Scottsdale, AZ (US); Steven Daniel Howe, Phoenix, AZ (US); Jack R. Miller, Tempe, AZ (US)

(73) Assignee: ThermaSat Inc., Scottsdale, AZ (US)

( * ) Notice: Subject to any disclaimer, the term of this patent is extended or adjusted under 35 U.S.C. 154(b) by 1000 days.

(21) Appl. No.: 17/806,343

(22) Filed: Jun. 10, 2022

(65) Prior Publication Data

US 2022/0411110 A1 Dec. 29, 2022

Related U.S. Application Data

(63) Continuation-in-part of application No. 17/449,508, filed on Sep. 30, 2021.

(60) Provisional application No. 63/209,022, filed on Jun. 10, 2021, provisional application No. 63/085,915, filed on Sep. 30, 2020.

(51) Int. Cl.
*B64G 1/40* (2006.01)
*F03H 99/00* (2009.01)

(52) U.S. Cl.
CPC ............. *B64G 1/401* (2013.01); *B64G 1/409* (2013.01); *F03H 99/00* (2013.01)

(58) Field of Classification Search
None
See application file for complete search history.

(56) References Cited

U.S. PATENT DOCUMENTS

| | | | | | |
|---|---|---|---|---|---|
| 4,781,018 | A | * | 11/1988 | Shoji | B64G 1/401 |
| | | | | | 244/171.1 |
| 4,945,731 | A | * | 8/1990 | Parker | F03G 6/071 |
| | | | | | 60/659 |
| 6,290,185 | B1 | * | 9/2001 | DeMars | F24S 60/00 |
| | | | | | 244/171.1 |

(Continued)

FOREIGN PATENT DOCUMENTS

| | | |
|---|---|---|
| CN | 104005923 A | 8/2014 |
| GB | 1439754 A | 6/1976 |
| WO | 2021/252087 A2 | 12/2021 |

OTHER PUBLICATIONS

Fiona Leverone, Angelo Cervone, Eberhard Gill, "Cost analysis of solar thermal propulsion systems for microsatellite applications," Acta Astronautica 155 (2019) 90-110. (Year: 2019).*

(Continued)

*Primary Examiner* — David P. Olynick
(74) *Attorney, Agent, or Firm* — PIERSON FERDINAND LLP; Keats Quinalty

(57) ABSTRACT

ThermaSat™ propulsion system uses water as a safe and non-explosive propellant, and which is unpressurized at liftoff. Utilizing solar thermal propulsion, the compact and efficient capacitor heats water to steam to produce high thrust and total impulse. The advanced optical system allows for the thermal capacitor to charge through solar power alone with no protruding concentrators or power draw from the main bus. Additional solar panels, body mounted to the ThermaSat, provide auxiliary heating of the thermal capacitor when not directly incident to sunlight to promote non-sun pointing operations.

15 Claims, 27 Drawing Sheets

Incident Light ----→
Short Wave-Lengths ------→
IR/Large Wavelengths ⟶

Gold Mirror
Hot Mirror
Photonic Crystals
Thermal Capacitor

Visible Light Able to Pass Through PhC's & Filters

Thermal Capacitor Heats Until Short Wavelengths can Radiate Through PhC's

IR Unable to Pass Through PhC's & Filters

(56) References Cited

U.S. PATENT DOCUMENTS

| | | | | |
|---|---|---|---|---|
| 6,412,274 | B1 * | 7/2002 | Miller | F24S 20/20 |
| | | | | 60/203.1 |
| 8,827,209 | B2 * | 9/2014 | Tillotson | F03H 1/0018 |
| | | | | 244/171.1 |
| 2006/0227830 | A1 | 10/2006 | Keady | |
| 2018/0265224 | A1 * | 9/2018 | Foulds | B64G 1/401 |
| 2021/0143773 | A1 | 5/2021 | Sheerin et al. | |
| 2021/0343890 | A1 | 11/2021 | Vaananen | |
| 2022/0097874 | A1 | 3/2022 | Howe et al. | |
| 2022/0290635 | A1 * | 9/2022 | Sercel | F02K 9/68 |

OTHER PUBLICATIONS

Mookesh Dhanasar, William Edmonson, and Frederick Ferguson, and Isaiah Blankson, "Small Satellite Solar Thermal Propulsion System Design: An Engineering Model," 10.2514/6.2014-1729, American Institute of Aeronautics and Astronautics, Inc. (Year: 2014).*

M.R. Gilpin, D.B. Scharfe and M.P. Young, "Phase-Change Thermal Energy Storage and Conversion: Development and Analysis for Solar Thermal Propulsion," 48th AIAA/ASME/SAE/ASEE Joint Propulsion Conference & Exhibit Jul. 30-Aug. 1, 2012, Atlanta, Georgia, AIAA 2012-3715. (Year: 2012).*

Youngsuk Nam, Yi Xiang Yeng, Andrej Lenert, Peter Bermel, Ivan Celanovic, Marin Soljaić and Evelyn N. Wang, "Solar thermophotovoltaic energy conversion systems with two-dimensional tantalum photonic crystal absorbers and emitters," Solar Energy Materials & Solar Cells 122(2014) 287-296. (Year: 2014).*

Dovie E. Lacy, Carolyn Coles-Hamilton, and Albert Juhasz, "Selection of High Temperature Thermal Energy Storage Materials for Advanced Solar Dynamic Space Power Systems," NASA Technical Memorandum 89886. (Year: 1987).*

Matthew R. Gilpin, "High Temperature Latent Heat Thermal Energy Storage to Augment Solar Thermal Propulsion for Microsatellites," Dissertation Presented to the Faculty of the Graduate School University of Southern California, Aug. 2015. (Year: 2015).*

PCT Notification of Transmittal of the International Search Report and the Written Opinion of the International Searching Authority, or the Declaration, PCT/ISA/220, PCT/US2021/052875, Dated Aug. 11, 2022, 19 Pages.

International Searching Authority of the PCT (US); "Notification of Transmittal of the International Search Report and the Written Opinion of the International Searching Authority, or the Declaration" dated Aug. 23, 2023; PCT Application No. PCT/US2023/24432 pp. 1-9 (2023).

* cited by examiner

372

Specific Impulse and Thermal Capacitor Temperature

Thrust and Delta-V

Receiver

Outlet

Parabolic
Concentrator

Inlet

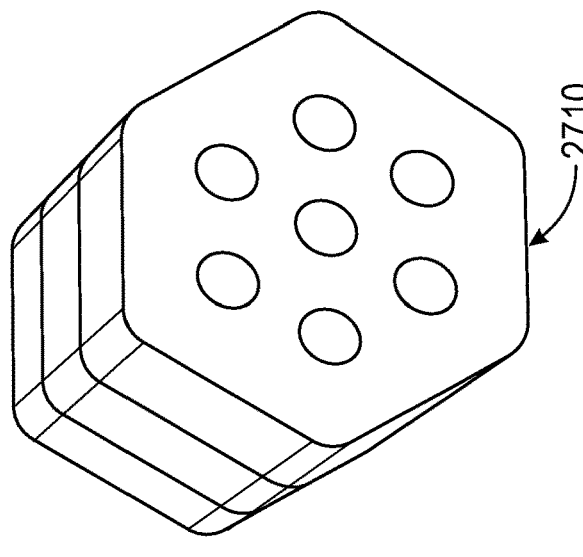
2700
2710
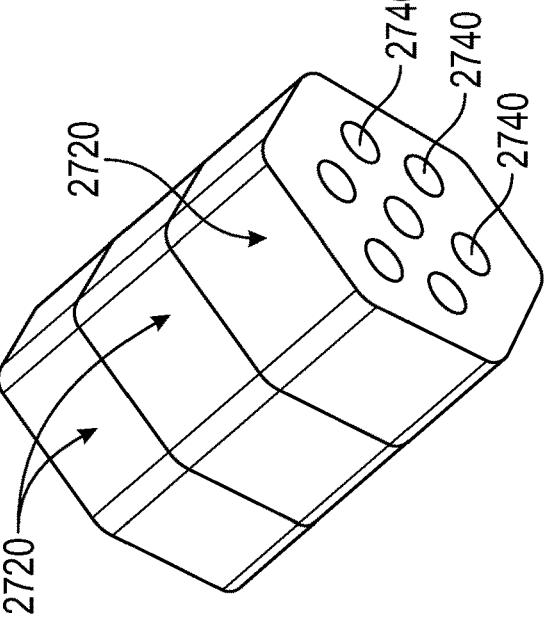
2720
2720
2740
2740
2740
2740
FIG. 27
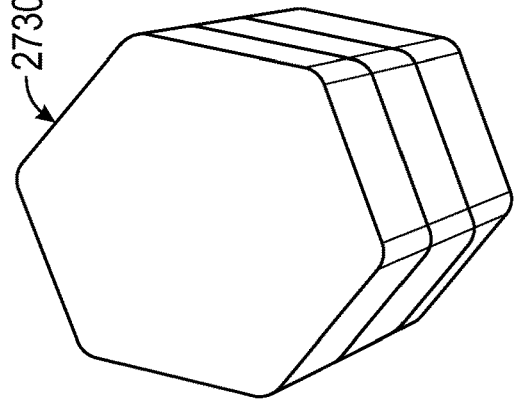
2730

ThermaSat SOLAR THERMAL PROPULSION SYSTEM

CROSS REFERENCE TO RELATED APPLICATION

This application claims the benefit of the filing date of U.S. Provisional Patent Application Ser. No. 63/209,022, filed Jun. 10, 2021, and is a continuation-in-part of U.S. patent application Ser. No. 17/449,508, which claims the benefit of the filing date of U.S. Provisional Patent Application No. 63/085,915, filed Sep. 30, 2020, the disclosures of each which are incorporated, in their entirety, by this application.

SUMMARY

Nanosatellites, more commonly known as CubeSats, are U-class spacecraft that are a quickly emerging multi-million-dollar industry. They provide universities and businesses the means to perform space exploration and technology demonstrations at feasible price points for programs with limited budgets. CubeSats have a compact form factor that allow them to be added as secondary payloads to launch vehicles with dedicated deployment mechanisms. With CubeSats, more missions can be performed at a faster pace with less cost than traditional satellites. While originally limited to technology demonstrations, their compact form factor, low manufacturing cost, and lower launch costs to orbit, has positioned CubeSats on the forefront of the NewSpace revolution. Industries are establishing constellation networks of satellites for Earth observations, communication networks, and distributed networks of instruments forming commercialization opportunities in space.

The introduction of NASA's Venture Class Launch Services Contracts, increases in global communication requirements, and Earth observing data will cause an increase in the number of micro and nanosatellites launched into orbit within the next decade. While many subsystems have advanced rapidly, a primary system requiring improvement is propulsion. These systems are needed for station keeping, orbital maneuvers, and constellation deployment. Companies trying to establish constellation networks for communications and Earth observing face astronomical costs to launch their network of satellites into orbit. Even with the emergence of new launch services, it is more economically feasible to launch multiple CubeSats from a single launch vehicle with or without a primary payload. Typically lacking a propulsion system, these satellites are constrained within an orbit and are unable to distribute themselves effectively for a constellation network. To reduce costs of establishing these networks, constellations of CubeSats, interceptors, and interplanetary missions will require a versatile, high thrust propulsion system.

Typically, propulsion systems for CubeSats are categorized into electric and non-electric systems. Electric systems require power from an already power-limited spacecraft and deliver low thrust with high specific impulse. While this results in efficient maneuvers, the power and time required to complete these maneuvers is substantial. The other propulsion category is non-electric systems such as cold gas, liquid and solid rocket systems. These systems only require power to regulate the firing of propellant. These systems generally preform at a higher thrust and lower specific impulse than electric systems. Many of these systems have been developed for larger satellites with a lack of scalability to nanosatellite sized spacecraft, and often require hazardous propellants, high storage pressures, and complicated designs not suitable for current, future, or all CubeSat standards and missions.

The present apparatus and system provide a high performance solar thermal thruster, referenced herein as ThermaSat™, that greatly expands CubeSat mission capabilities and mitigates the drawbacks of traditional propulsion systems. This will decrease the establishment costs of constellations and encourage industries initially averted by the high cost of establishing these networks. This will bring the communication networks, Earth observation constellations, and distributed networks of instruments into reality, prompting a level of connectivity and Earth science previously unknown to the world.

In one aspect, the ThermaSat propulsion system is a solar thermal propulsion (STP) system implemented in a CubeSat form factor. Traditional STP systems require large concentrators to focus solar energy on a thermal capacitor, adding significant complexity, multiple failure modes, and excess mass. ThermaSat eliminates the need for concentrators by using a cutting-edge system of optical filters and photonic crystals to capture solar thermal radiation within a phase changing thermal capacitor. The inclusion of photonic crystals in the optical filter system enables exceptional solar heating and high temperatures. Water, an exceptional green propellant, is heated by the thermal capacitor and expanded out of a traditional nozzle to produce high thrust levels. This propellant mitigates many issues faced with traditional propellants as it is non-explosive, readily available, and poses little to no risk to primary payloads. ThermaSat requires no deployable structures, limiting a significant failure mode for most satellites, and requires scant power to operate; reserving large amounts of power to the primary payload.

The present apparatus and ThermaSat systems provide advancements to CubeSat propulsion technologies by investigating advanced solar thermal propulsion techniques utilizing photonic crystals, green propellant, and energy storage via phase change materials. The results of which can be applied to several applications including constellation deployment, power storage and generation, and interplanetary CubeSat missions. The debut of new launch vehicle services, particularly for small satellites, is driving the launch cost per kilogram down as newer technologies emerge. A reduction in launch costs and the compact form factor of nanosatellites is culminating in a massive surge to commercialize space with communication networks, remote sensing satellites, and commercial launch services. The robust propulsion system further decreases the cost to establish satellite constellations and drastically improve the mission capabilities of micro and nanosatellites.

The current CubeSat market is estimated to reach $375 million by the year 2023, with the overall small sat market estimated to be worth over $30.1 billion. The ThermaSat propulsion system can be utilized for a variety of satellite sizes, with a modular architecture to adapt to any mission and satellite. While this system has been designed for the CubeSat format, it is easily scalable to other form factors. The surge towards the NewSpace revolution is driven by small satellites as well as the abundance of new launch vehicles promising ever cheaper launch services. While competition has been driving down launch costs, it is still the most prohibitive expenditure in creating a constellation network. This number varies greatly between launch vehicle suppliers and ride sharing providers. Those who choose not to have a dedicated launch for a cluster of satellites must typically go through a third-party ride share provider. Venture class launch vehicles offer substantially lower launch prices than previous launch providers. While the cost per kilogram into orbit may exceed that of traditional launch providers, the venture class launch vehicles offer dedicated missions for small satellites, attracting a new market of customers. Most of the new launch vehicles support a few hundred kilograms to orbit, with only a few advertisings 50 kilograms or less. Establishing these networks can incur multi-millions and potentially multi-billions of launch costs alone.

One example of these costs would be the establishment of an 8-satellite constellation in a single orbit each with a 45° phase difference. The traditional method to send CubeSats into orbit is ride share with a major launch company. These ride shares would cost upwards of $295,000-545,000 for a 3U and 6U satellite from Spaceflight Industries (note that 3U is composed of three CubeSats stacked lengthwise while 6U is composed of six CubeSats stacked lengthwise). To send a total of eight (8) 6U satellites into orbit, this would cost roughly $4,360,000. If all these satellites managed to get a ride share on a single launch vehicle, then a propulsion system would be required to maneuver them into the correct locations within the constellation to establish a 45° phase difference. The ability to maneuver in orbit would be a major requirement as finding eight (8) separate launches that would place the satellite into the correct constellation orbit is less likely.

The emergence of small satellite launch companies is promising in the establishment of CubeSat constellations. One company, with the lowest cost per launch, is Aphelion Orbitals. Estimated at $750,000 for a single launch (preliminary estimates only), this offers by far the cheapest single launch cost option to get into orbit. Eight separate launches would cost $6,000,000 in total. This price is still beyond that of establishing a 6U constellation with ride sharing.

Another option would be to choose a launch provider that provides a dedicated mission with multiple payloads into the correct orbit. Vector Launch offers such a vehicle that could potentially place all eight (8) CubeSats in orbit with a propulsion system for $1,500,000. With a propulsion system to position these satellites that is a $2,860,000 savings over the ride share mission, and a $4,500,000 savings compared to individual launches to establish orbits with Aphelion Orbitals. Current and future constellations will likely contain hundreds and potentially thousands of satellites. The ability to launch a single group of satellites with a robust propulsion system to organize themselves could save millions of dollars (note that total launch cost was chosen in these scenarios instead of cost per kilogram because of payload volume constraints (while a launch vehicle could lift 250 kg to Low Earth Orbit (LEO), 250 kg of satellites may exceed the payload volume allowance)).

Additional costs that customers must concern themselves with is the price to replace dead satellites in orbit. A typical CubeSat without a propulsion system lasts for only a few years before its orbit decays enough to burn up in the atmosphere. This would require a company to spend a minimum of $295,000 to send a 3U satellite into orbit on a ride share, not to mention the costs to produce the CubeSat and logistics involved. A constellation that can remain in orbit for an extended period drastically reduces costs and will only need replacement in case of a complete hardware or launch failure.

Additionally, CubeSats within academia and industry often face short development times and can often see testing cut short. This results in key systems not being tested thoroughly enough, by some estimates only 53-65% of CubeSat missions are a complete success. While there is a variety of reasons a CubeSats mission could fail, a prime source of failure comes from the complexity of the satellite including the deployable mechanisms. Solar panel failures, even in larger satellites that see more rigorous testing and development, have constituted a large portion of satellite failure modes. If only 65% of the satellites reach success in their missions, hundreds of thousands if not millions of dollars would be required to produce and launch replacement satellites.

As discussed hereinabove, current propulsion technologies focus on electric propulsion and non-electric propulsion. Electric propulsion technologies require large portions of power from the spacecraft bus, which hinders the performance of other CubeSat subsystems. These systems typically require deployable solar panels to increase the available power. Failure to deploy these arrays is one of the greatest failure modes for CubeSats as the spacecraft does not receive enough power for its propulsion system and will result in attitude control difficulties. Additionally, because these systems provide very low thrust, maneuvers can take weeks or months to complete, and constant manning of such deployment methods is not feasible for multiple constellation deployments. Current non-electric thrusters include monopropellant, cold gas, solid motors, hybrid motors, and bipropellant thrusters.

Monopropellant thrusters have been in development for many decades and have a vast array of flight heritage. The primary monopropellant that has been utilized is hydrazine. This propellant is infamous for being hazardous but provides high performance for ADCS system as well as some primary propulsion systems for larger spacecraft. Hydrazine produces 150-250 s of specific impulse with a high specific gravity. Hydrazine's toxicity poses a danger to ground operations as well as primary payloads, making its use in a widespread market challenging. If used as a propellant for the thousands of proposed satellites, the probability of costly and disastrous accidents increases as well. Newly emerging "green propellants" with similar properties to hydrazine are a promising monopropellant alternative. The reduced toxicity and handling hazards as well as performance increase over hydrazine make clean alternatives attractive.

One of the simplest thrusters currently available is the cold gas thruster, where a pressurized gas is pushed through a nozzle to produce thrust. Cold gas thrusters are simple in design but lack high thrust, offer limited performance, and remain primarily limited to attitude control. Warm gas thrusters provide greater performance over their cold gas counterparts, but they can require up to 15 W of power to operate the heater; a major power drain on spacecraft systems.

Solid rocket motors have been proven on small satellites with traditional solid rocket propulsion as well as the more innovative Electrically-controlled Solid Propellant (ESP). This method allows solid propellant to be ignited via an electric current (and only when the current is applied). Los Alamos National Lab developed a solid propulsion system that separates the fuel and oxidizer combination. This system reduces the risk of accidental detonation of fuel and oxidizer combinations during launch as they are stored separately. While innovative, the ability for these motors to be turned on and off for precise ΔV control remains questionable. Traditional composite grains face catastrophic consequences if fuel grains fracture during launch and the systems described above may still be subject to this feature. The simplicity and high thrust of these propellants is shadowed by the inability for precise ΔV control.

Hybrid rocket motors include a fuel grain and liquid or gaseous oxidizer that reacts to produce thrust. While this technology has been demonstrated on a larger scale, it is still in its infancy for CubeSat development. The major advantage of hybrid motor systems is a relatively high specific impulse, high thrust, and the ability to store oxidizers and fuels separately limiting dangers to the primary payload during launch. In more complex systems, some oxidizers can be used as monopropellant thrusters (i.e., hydrogen peroxide decomposition on a silver catalyst bed) for ADCS systems. However, hybrid rocket engine performance is a complex system that focuses on many variables such as grain geometry, decomposition rate, and oxidizer to fuel ratios. After each maneuver burn, these variables can change, potentially complicating the next set of maneuvers.

Bi-propellant thrusters are considered the highest performing traditional propulsion systems. They can achieve high specific impulses with high thrust output compared to other non-electric propulsion techniques. One innovative method used for CubeSats is the electrolysis of water in orbit by Tethers Unlimited's HYDROS system. This bi-propellant system consists of a gaseous hydrogen and oxygen thruster which is electrolyzed in space from a liquid water tank. However, electrolysis of the water in micro gravity adds complexity to the system and drains power from the spacecraft bus as well. Another company, Benchmark Space Systems, is developing a high-test hydrogen peroxide (HTP) and alcohol bi-propellant thruster, both storable at ambient conditions, capable of 285 s of specific impulse and 1.25N of thrust to provide up to 160 m/s of AV for an 8 kg CubeSat. While these systems provide high thrust and specific impulse, the complexity within the system provides many failure modes.

As nanosatellite and microsatellite missions increase, they will demand higher performance from propulsion systems. The market appears to be trending toward safer and more reliable propellants based on the information gathered from Pumpkin Space Systems, Aster Labs, and Dr. Craig Hardgrove. Most of the high thrust propulsion systems that do not use safe propellants will likely face difficulties due to their higher infrastructure costs and hazardous natures. The market will likely begin to lean more heavily on green propellants that are not dangerous to people or the environment.

The present ThermaSat systems utilize safe propellant that reduces ground handlings risks, further reducing costs as specialized containers and procedures are not required to transport the spacecraft.

Among other aspects, the modular components of the present ThermaSat systems include a thermal capacitor/optical system, intermediate pressure tanks, and liquid water storage tank. The ThermaSat systems include modular components that allow customers to order components to match exactly their mission parameters, and will decrease costs associated with designing specific use case systems reducing the complexity of the manufacturing and testing facilities required to create the system. Mass production of a few modular systems reduces variability and lead times for customers decreasing costs and increasing profit margins.

The optical system provides a passive means of heating, which can address an issue for many spacecrafts. The thermal capacitor can also store large amounts of energy, which may be useful on future missions. With a higher specific energy than most traditional batteries, 1.5 MJ/kg, ThermaSats' capacitor could be used for energy storage in missions where solar energy is not available for long periods of time. The optical system may be used for different applications as discussed above, and applied to interplanetary mission, primarily around the moon, Venus, or Mercury due to their proximity to the sun.

Another aspect of ThermaSat system is the significant advantage provided over traditional propulsion systems in the use of water as the main propellant. This greatly simplifies the design of the system and does not require specialized materials that may be required to contain more volatile or cryogenic propellants.

Solar thermal propulsion operates on the concept of capturing solar energy and directing it into a thermal capacitor which functions by storing heat and releasing it quickly into a propellant stream. Once the thermal capacitor has reached a peak temperature, propellant is introduced to the capacitor, heated, and expanded out of a traditional nozzle to produce thrust. This is similar in fashion to a resistojet or a nuclear thermal rocket (NTR), with the main difference being the power source for the thermal energy. These solar thermal systems can be used for missions into deep space because of the high temperatures and high performance capabilities that this method can provide.

In at least one embodiment, the ThermaSat solar thermal propulsion system includes two major factors to improve the performance of solar rocket systems, namely: selective transmission of light for high temperature operation and phase change materials for high power operation. In at least one aspect, the ThermaSat Plus (TS+) builds on the ThermaSat solar thermal propulsion system to provide extraordinarily high performance propulsion by employing solar concentrators and hydrogen monopropellant. These improvements increase the capabilities of the TS+ to be on par with nuclear thermal propulsion, without the need for radioactive materials.

In at least one aspect, the original ThermaSat system was developed as a zero-power, green propellant propulsion system for CubeSats. Without the need for deployed structures, the system provides small satellites the capabilities for station keeping, collision avoidance, and constellation deployment—while using liquid water as propellant. This capability was achieved with the use of a selectively transmissive optical system which reflects infrared light from the sun. Although this limited the total energy incident on the system, it also restricted radiative cooling and resulted in very high operational temperatures. The absorber beneath this system included a phase change material thermal capacitor to store the energy harvested from the sun. Over a period of hours, the thermal capacitor would collect energy and release it into the propellant stream during firing at very high power levels.

In at least one aspect, upgrading the ThermaSat system to the TS+ design allows for even higher temperatures and higher power operation. In one exemplary embodiment, the TS+ is capable of reaching over 800 seconds of specific impulse using a molten boron/graphite based thermal capacitor and specifically tuned photonic crystals in the optical filtration system. The TS+ design can be used, for example, for small satellites (inset), or for large vessels to the ISS, geostationary orbit, or the moon.

ThermaSat plus provides a number of variations including, for example:
  Use on large or small vehicles—The system can be scaled appropriately to nearly any size
  Use of hydrogen or other propellant (water, ammonia, etc.)—Hydrogen provides the highest Specific impulse (Isp), but other concerns such as cost, availably, or safety may require the use of other propellants. TS+ differs from the original ThermaSat design (even when using water) due to the solar collector array.

Dual mode use of the collector array—The array can be made of a parabolic dish or an array of small reflectors. When the collector is equipped with photovoltaic panels, it can provide electrical power to the spacecraft for electric propulsion, life support, general power needs, or other uses. Current designs use a selectively reflective material (short pass filter, dichroic mirrors, etc.) to allow certain wavelengths of light to pass through the reflector onto PV cells behind. The reflector still reflects light to the thermal capacitor, but only in the reflected wavelength range.

Adjustable array—The array can be used for other purposes besides heating the thermal capacitor, including, but not limited to, heating nearby objects, acting as a directed energy weapon, illuminating other objects, etc.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (Figs.) are listed below.

FIG. 27 shows an exemplary thermal capacitor.

It should be clear that the description of the embodiments and attached figures set forth in this specification serves only for a better understanding, without limiting scope. It should also be clear that a person skilled in the art, after reading the present specification could make adjustments or amendments to the attached figures and above described embodiments that would still be covered by the present disclosure.

DETAILED DESCRIPTION

The present disclosure is not limited to particular optical systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

Unless defined otherwise, all technical and scientific terms used herein have the same meaning as commonly understood by one of ordinary skill in the art.

Figure 1:
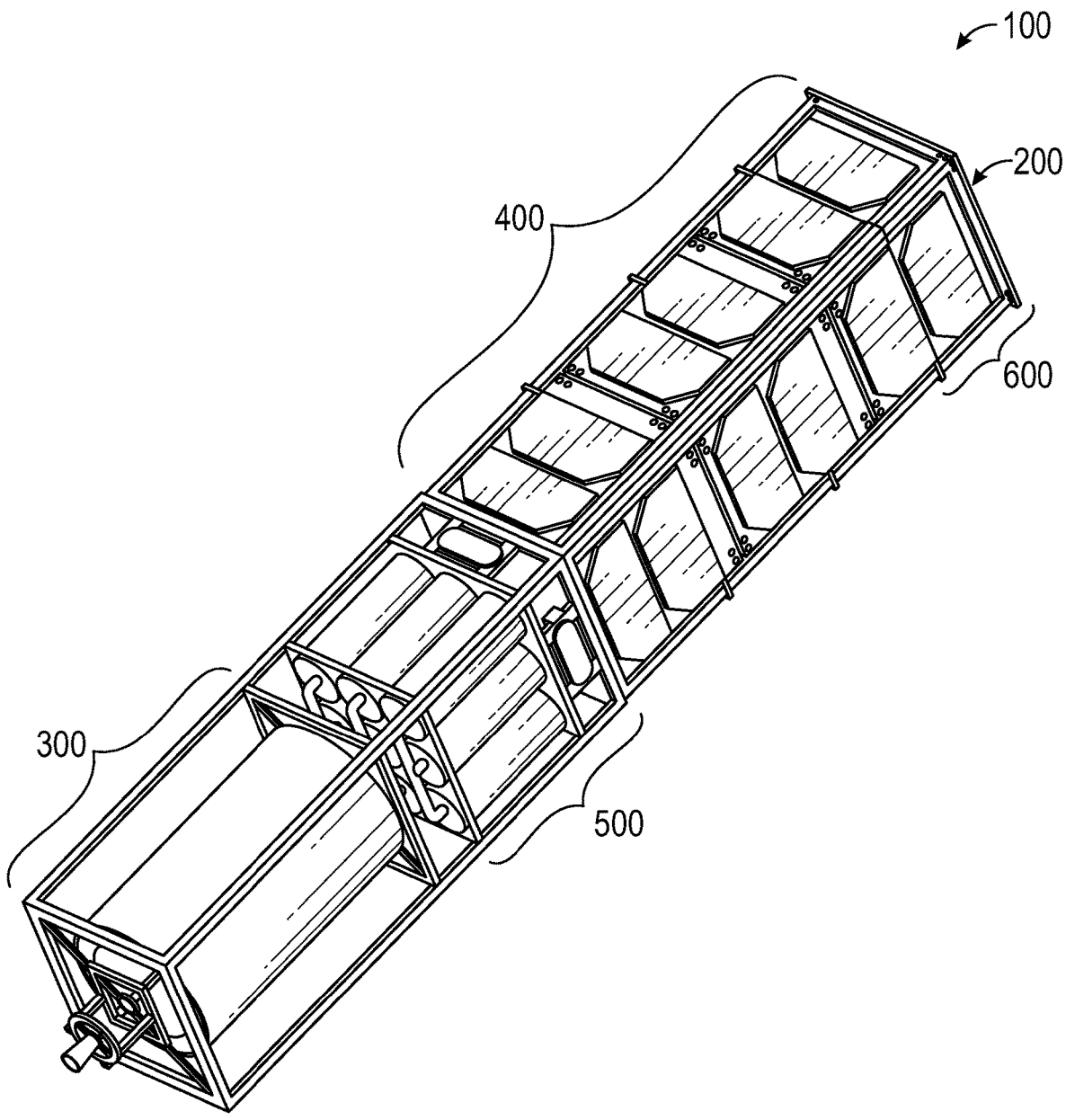
FIG. 1 shows a first embodiment of a ThermaSat propulsion system.

While most STP systems require large concentrators to focus light on the thermal capacitor, the ThermaSat system does not require concentrators or any deployable structures. This is done through an optical system comprising filters and photonic crystals which emulate the greenhouse effect to increase temperatures through selective photonic emission. This novel STP ThermaSat system is shown in FIG. 1 with the ThermaSat propulsion system shown in an exemplary configuration as including modular sections to create up to a 6×1U CubeSat capable of +200 m/s of ΔV for a 10 kg satellite. Payloads can be attached to the sides of the liquid storage tank or can be housed in the optional payload volume in the forward portion of the system. FIG. 1 shows ThermaSat system 100 with structure 200 and including thermal capacitor and optical system 300 of about 1.5U, liquid storage tank 400 of about 2.5 to 3.5U, intermediate pressure tanks 500 of about 1U, and optional volume for other subsystems 600 of about 0 to 1U. The thermal capacitor, comprising a graphite matrix embedded with phase changing salts, sits encased within the optical system at the aft end of the propulsion system. Intermediate pressure tanks store gaseous steam and preheat the propellant through the vapor dome. A fuel tank containing liquid water stores the propellant at low temperatures and pressures, reducing power consumption and danger to a primary payload during launch. The propellant is kept in liquid state until placed in orbit, thus reducing leaks and the need for thick walled pressure vessels.

Spectral manipulation is another aspect of the ThermaSat system, which contrasts other systems that include radioisotope thermophotovoltaic (RTPV) and solar photovoltaic systems. With lower power systems, such as radioisotope fueled system, good thermal isolation can assist in reaching useful operational temperatures. In space, the primary method of heat rejection is through radiative heat transfer, so properly modifying exposed surface can have major effects on the heating or cooling of objects.

Thermal Capacitor and Optical System:

Photonic Crystals:

Light interacting with matter will either be reflected, absorbed, or transmitted. Thin structures like gold foils will not noticeably absorb, and thus they are used only for transmission or reflection. Solid objects will not transmit, and instead will only reflect or absorb. For any given wavelength of light, the ability to absorb or transmit is equal to the ability to emit through thermal radiation. Photonic crystals (PhC's) and filters are useful in that they can be designed to reflect long wavelengths of light preferentially.

Photonic crystals are "periodic dielectric structures that have a band gap that forbids propagation of a certain frequency range of light," (see, e.g., http://ab-initio.mitedu/book/photonic-crystals-book.pdf) and can be made from metal with very small holes in the surface. On the surface of the graphite thermal capacitor 370 is an array of PhC's 372 (see FIGS. 2 and 3). These structures act as a selective emitter which preferentially emit long wavelengths of light. Having this material on the surface is the first step in limiting the total radiative emission of the thermal capacitor. Without the ability to reject heat, the surface will naturally increase in temperature.

Figure 2:
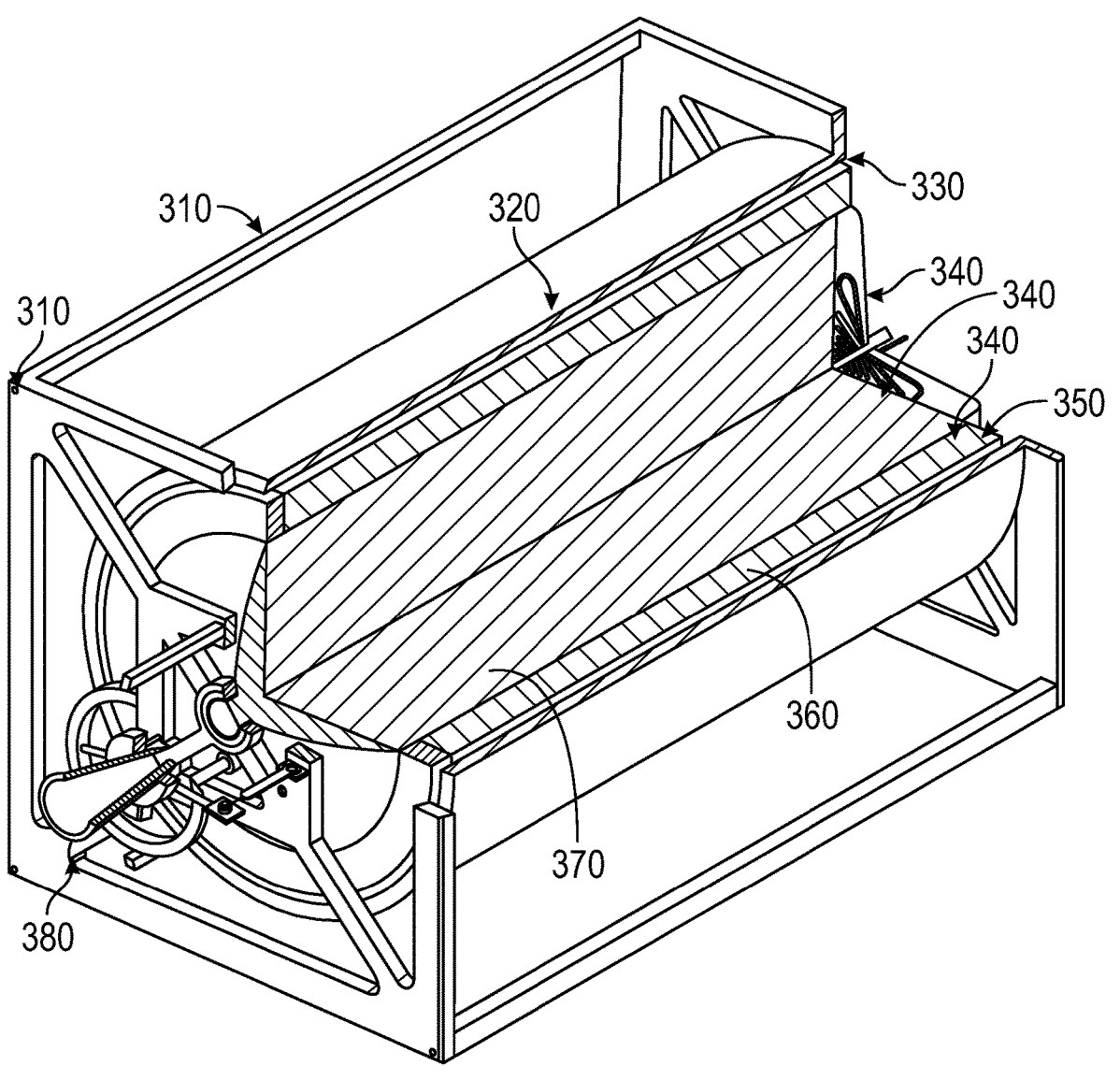
FIG. 2 shows a thermal capacitor.
Figure 3:
FIG. 3 shows an exemplary photonic crystal structure.
Figure 3:
Figure 4:
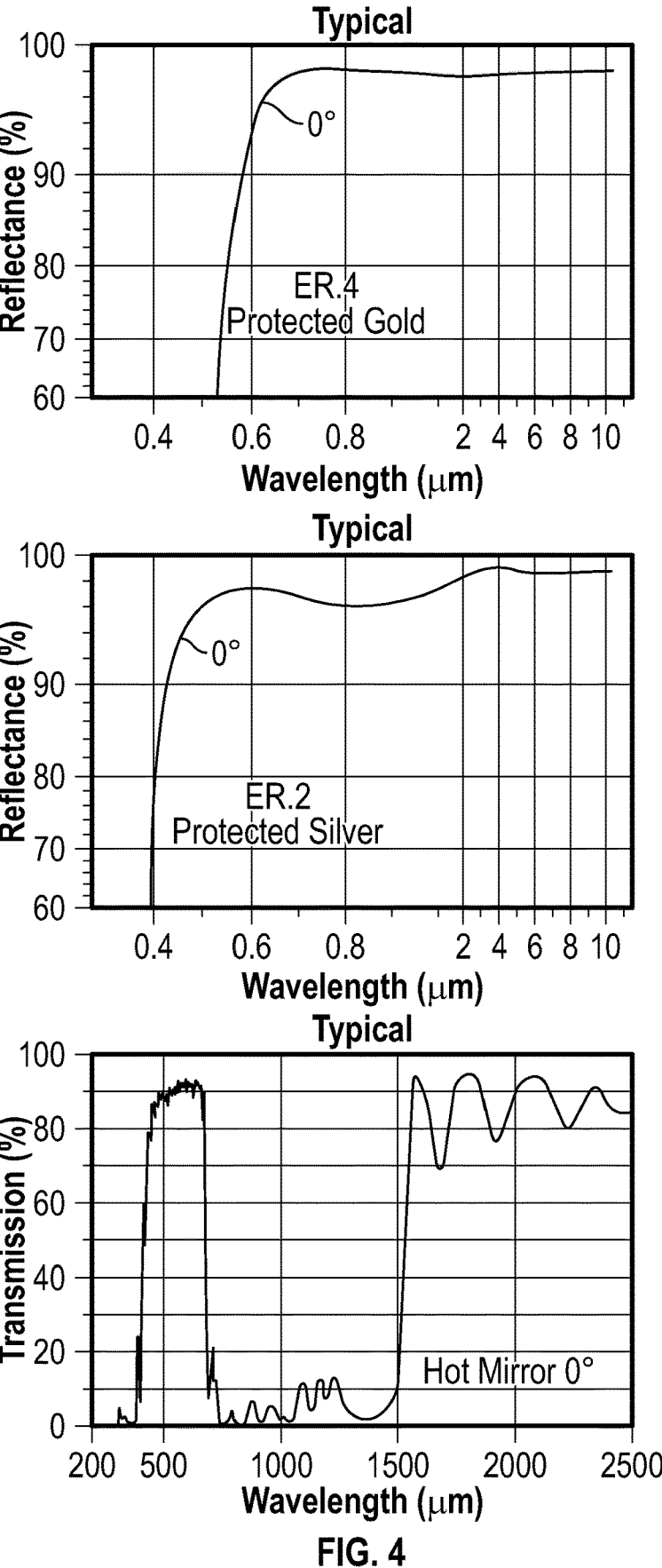
FIG. 4 shows reflectance and transmission behavior of selective emitters that can be utilized to reduce infrared wavelengths with the ThermaSat system.

Hot Mirror:

FIG. 2 shows a thermal capacitor made from graphite, phase change materials, and tantalum photonic crystals. The optical system can heat the capacitor to temperatures in excess of 1000° K with little to no power input. This is accomplished via the optical system comprising of a gold mirror 320, hot mirror 330, and photonic crystals 360. Charging of thermal capacitor can also occur via an internal heating filament to supplement the solar input. The thermal capacitor 300 shown in FIG. 2 also includes structure 310, gold mirror 320, hot mirror 330, flow channels 340, silica aerogel spacers 350, tantalum photonic crystals 360, graphite and PCM thermal capacitor 370, and thruster mount 380. The second mirror 330 surrounding the thermal capacitor, shown in FIG. 2, is a type of dielectric mirror known as a dichroic filter. Dichroic filters are well known for separating wavelengths. A hot mirror 330, a special type of dichroic filter, can be used normal to oncoming light and specifically focuses on reflecting infrared radiation while transmitting visible. An example of a hot mirror's transmission spectrum is shown in FIG. 4. While this mirror does have excellent transmission at short wavelengths, it does have a noticeable gap for a region in the long wavelengths. The wavelengths in this region will pass through the hot mirror 330 and be reflected by the gold mirror 320 surrounding the hot mirror 330. This second mirror 330 exists to further reduce the infrared wavelengths escaping the system.

Gold Mirror:

The gold lined first surface quartz mirror acts as the outermost "filter" to reflect infrared light. Gold acts as a natural selective emitter, reflecting infrared wavelengths and transmitting visible light. An example of the reflectance from a first surface gold mirror can be found in FIG. 4. FIG. 4 shows reflectance and transmission behavior of commercially available selective emitters that can be utilized to reduce infrared wavelengths within the ThermaSat optical system. Silver is also a potential mirror coating as well, as it also acts as a natural selective emitter, but for this purpose gold is used for higher overall performance.

This optical system has been designed to reduce the infrared wavelengths transmitted by the capacitor situated in the center of the optical system. Reduction of emitted infrared wavelengths is key in obtaining high operating temperatures because it limits the object's ability to reject heat.

Thermal Capacitor:

The thermal capacitor can absorb energy at virtually any angle to the sun based on its cylindrical geometry. This was done to reduce attitude control requirements on the spacecraft. The cylindrical thermal capacitor is shown in FIG. 2 surrounded by the optical system. The size of the thermal capacitor is adequate to absorb an enough solar energy to reach the necessary operating temperatures for the ThermaSat system design. When performing sustained ΔV burns, the temperature of the core will decrease quickly if a solid thermal capacitor is used, resulting in large performance difference between the beginning of the firing and end of firing. Using a material that can store large amounts of heat and maintain high temperatures is paramount in having an effective warm gas thruster. Thus, the ThermaSat uses a phase change material (PCM) contained within a graphite casing.

PCMs require latent heat energy to conduct phase changes. As the phase change material sustained a high temperature for a long duration burn, a salt, 80LiOH+20LiF, was chosen because of its melting point around 700° K and high latent heat of fusion.

Because of the small size of the propulsion system and the tendency for the optical system to reject a fraction of the solar spectrum, a heating filament is included within the thermal capacitor for supplementary power from a small photovoltaic array on the liquid propellant tank. This array is small enough to maintain a viable operating temperature in the vacuum of space and has the added benefit of shielding the propellant tank from the sun. In the exemplary embodiment shown in FIG. 2, a total of 21 flow channels pass through the thermal capacitor. The flow channels are where the steam will flow to absorb the heat from the thermal capacitor prior to being expelled out of the nozzle.

Propulsion System:

Propellant:

Water is a readily available green propellant that is a liquid at low temperatures, stores easily at atmospheric pressure, and has no explosive or corrosive risks. While water has a higher molecular mass than other propellants, its high density allows more propellant to be stored on board the CubeSat for high thrust maneuvers with a large ΔV budget.

Figure 5:
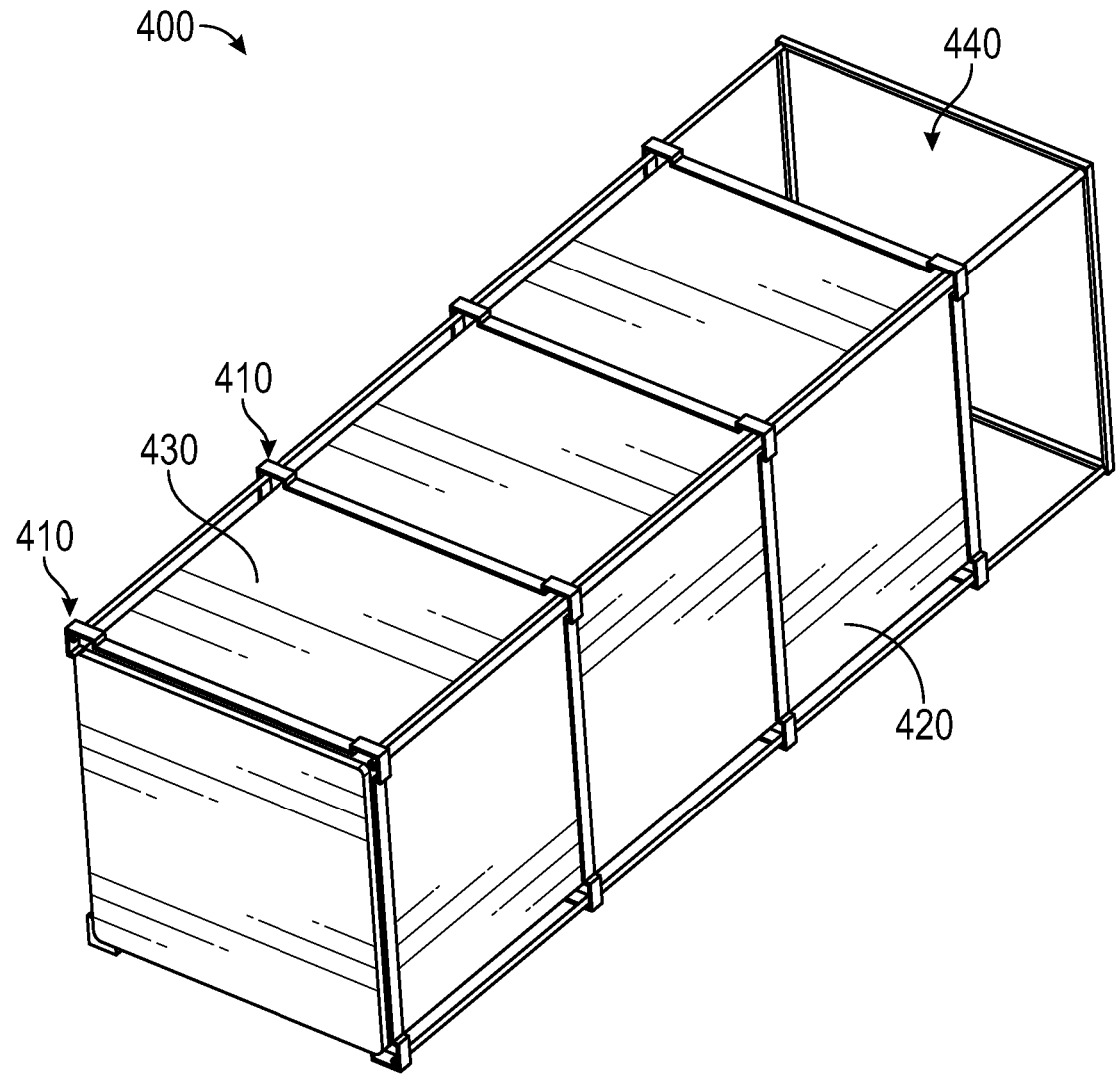
FIG. 5 shows a liquid water storage system.

Liquid Water Tank:

The largest structure on ThermaSat is the liquid propellant tank 400. In one exemplary configuration as shown in FIG. 5, the tank 400 occupies about 2.7U and is pressurized at 1 atm at 300 degrees K. FIG. 5 shows liquid water storage including a 2.5-3U tank 400, structure 410, liquid $NH_3$, multi-layer insulation 430, and optional space for subsystem 440. Tank size is dependent on payload mass as well as requirements to include additional subsystems based on mission profiles. In this exemplary embodiment, the propellant tank stores water at 1 atm. Multi-layer insulation or PV cells can be attached to the outside of the propellant tank. The tank 400 has a small bladder of gas at the back to help push the liquid water out of the tank 400. The pressure is not high enough to be of concern to the primary payload during launch, and its low temperature storage mitigates dependency on the CubeSat's power system. The liquid tank size can be customized to contain different amounts of propellant depending on the mission profile, as well as support supplementary PV cells for additional power.

Figure 6:
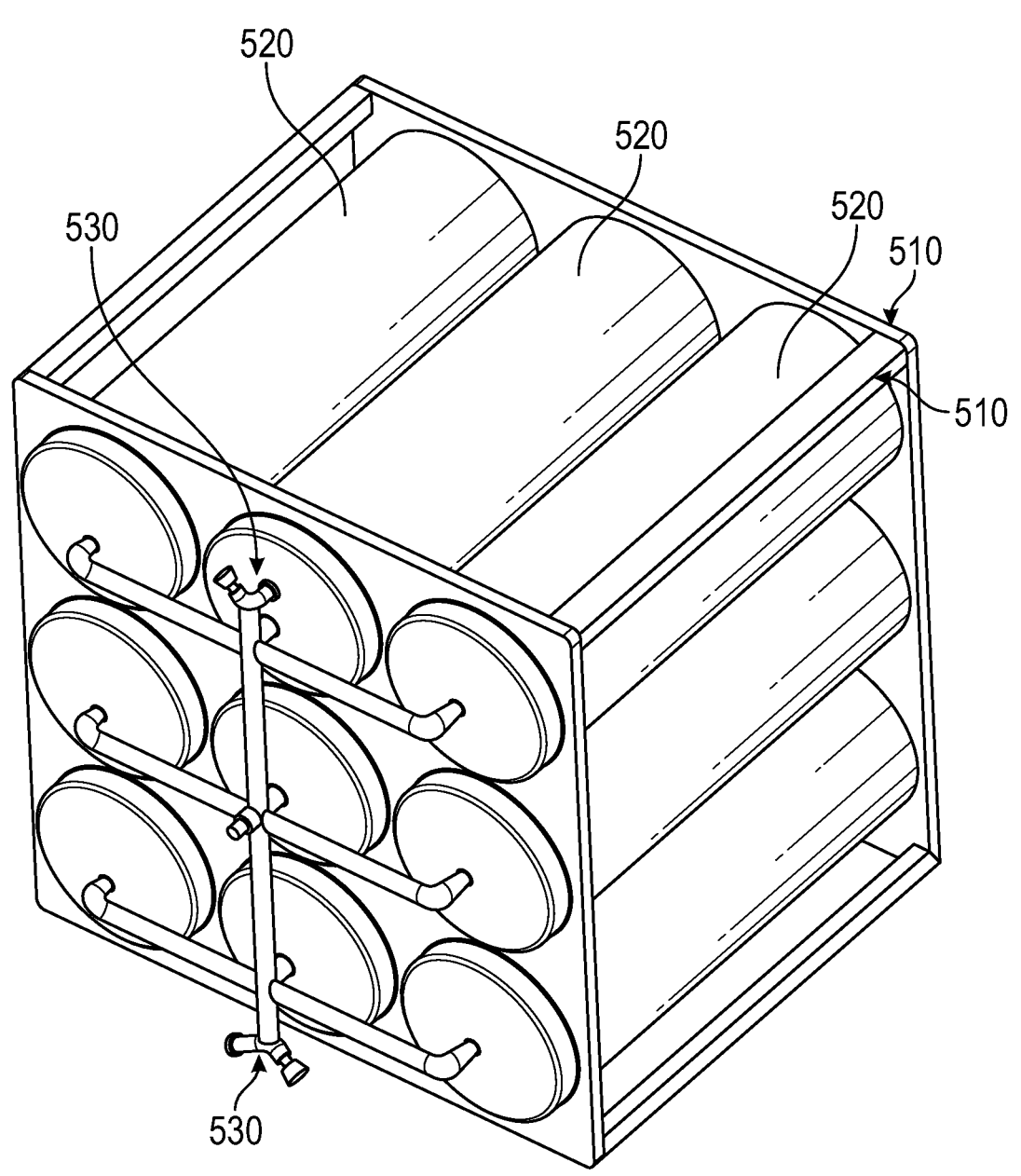
FIG. 6 shows intermediate pressure tanks.

Intermediate Gaseous Steam Tank:

Nine intermediate pressure tanks 500 are situated between the liquid propellant tank and the thermal capacitor. These tanks 500 are designed to hold high pressure gaseous steam and are shown in FIG. 6. As shown in FIG. 6, intermediate pressure tanks hold gaseous steam. Also shown in FIG. 6, the tanks 500 include a structure 510, high pressure $NH_3$ storage tanks, and ADCS thrusters 530. Multiple pressure vessels chosen due to high structural integrity compared to a single large tank. Roll control thrusters are located between the intermediate pressure tanks and thermal capacitor. Liquid water conducts a phase change between a liquid and gas requiring an energy input similar to the phase changing material of the thermal capacitor. If the thermal capacitor was used to heat the liquid water into a gas directly, it would severely reduce its effectiveness as a significant amount of energy would be wasted to gasify the propellant.

Instead this system injects enough liquid water into the propellant tank for a small $\Delta V$ burn. The injected liquid will vaporize into a gas, as the temperature required to reach a gaseous state is achievable just from seeing the sun. Once it is in a gaseous state, it can be released through the thermal capacitor.

Several smaller pressure vessels are used to keep stresses in the tanks low and provide redundancy against leaks or ruptures. The nozzle, situated at the far end of the CubeSat, can be rotated on a gimbal to control the pitch and yaw of the craft. Between the intermediate tanks are four attitude control thrusters 530, which are fed by a valve near the main nozzle. These utilize the gaseous water as an attitude control system (ACS). These thrusters have upwards of 150 s of specific impulse and influence the CubeSats roll motion.

Figure 7:
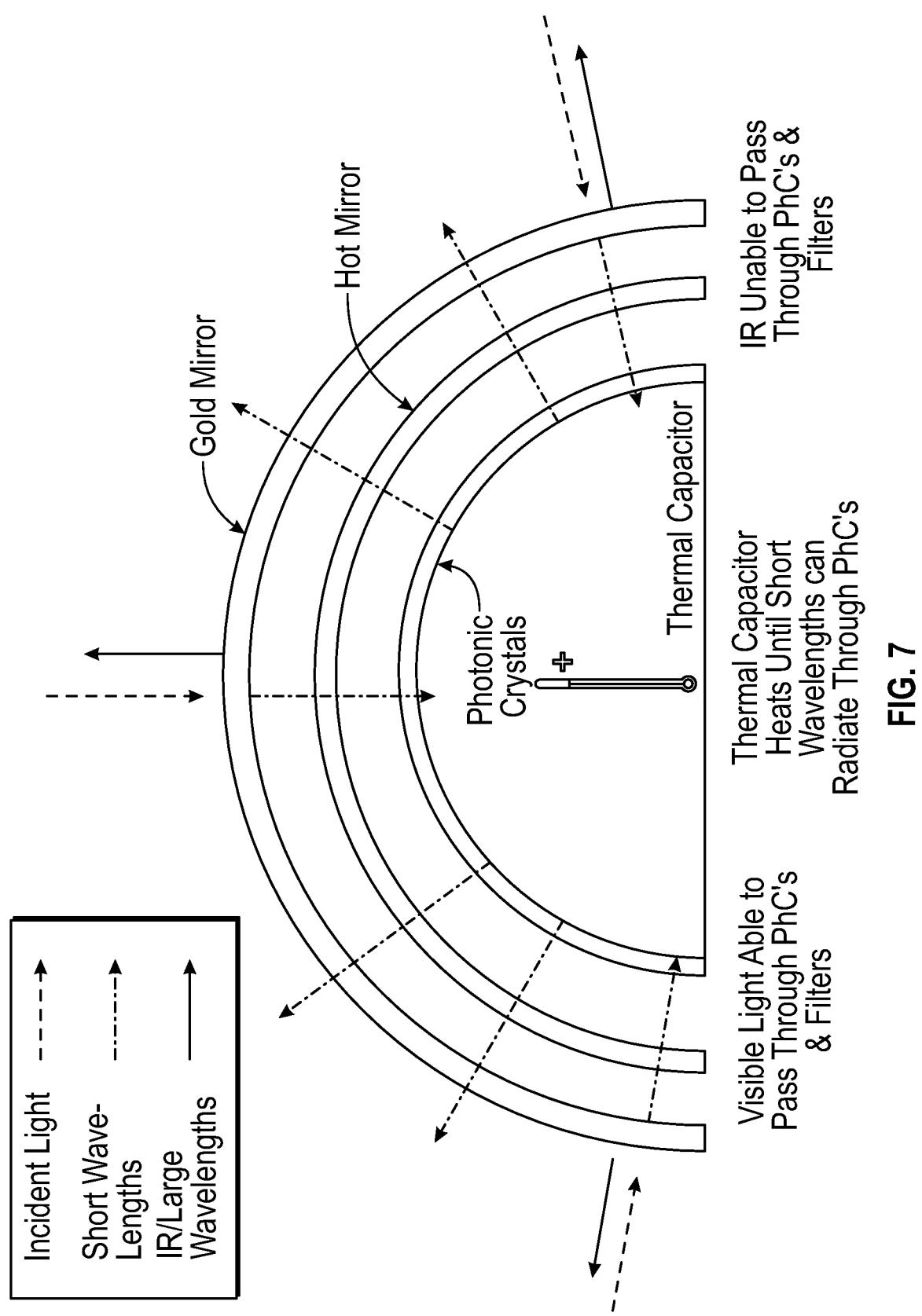
FIG. 7 shows the optical system prevents infrared wavelengths from passing through, either reflecting external photons or trapping internally generated ones.

The operation of gas thrusters is greatly influenced by the temperature of the propellant as it is expelled from the nozzle. This is because the main driving force of the thruster comes from thermal expansion of the propellant within a heat exchanger or combustion chamber, which causes the volume of the gas to increase and be rapidly expelled through the nozzle. This system uses natural sunlight as a heat source to achieve high temperatures and high performance and is shown in FIG. 7. FIG. 7 also shows optical system preventing infrared wavelengths from passing through, either reflecting external photons or trapping internally generated ones. Photonic crystals absorb the shorter wavelengths and prevent infrared radiation emission. Without the ability to radiate the absorbed energy, the thermal capacitor is forced to increase in temperature to radiate at shorter wavelengths that can pass through the optical system.

Naturally, a surface exposed to the sun will absorb energy, increase in temperature, and radiate energy until the absorbed and radiated energy are equal in magnitude. The key in heating this novel STP system's thermal capacitor is the optical systems ability to limit the low energy/long wavelength portion of the blackbody emission spectrum. An object's temperature dictates at what wavelengths it will radiate energy. As the object increases in temperature, it will radiate energy in shorter, more energetic wavelengths. At lower temperatures, surfaces radiate energy in the infrared spectrum. However, these wavelengths are too large to exist within the PhC's, and so the radiative emission is severely limited. Without the ability to radiate the absorbed energy, the thermal capacitor will increase in temperature until it begins to radiate at the short wavelengths that can exist inside the structure.

To augment any imperfections in the PhC's, be they from manufacturing defects or interstitial spaces between periodic structures, two layers of optical mirrors are included to reflect any emitted long wavelength photons. When this occurs, they are reflected by the optical mirrors, and again by the PhC's and back again until the photons are reabsorbed by the surface or eventually escape through transmission.

Incident solar power heats the thermal capacitor but is also affected by the properties of the optical system. The solar spectrum has roughly 30% of its total energy within the band of 1-micron wavelength light and longer. Because the system cannot emit or absorb that light, it is reflected and generally lost. However, the remaining solar irradiance continues to heat the thermal capacitor, and the lack of radiative cooling from the surface results in a much hotter steady state temperature. This is often referred to as the "greenhouse effect."

During operation, the thermal capacitor continues to increase in temperature and radiate at progressively smaller wavelengths. Eventually it reaches an equilibrium point were the energy absorbed is equal to the radiated energy. At this point the thermal capacitor has reached a temperature far exceeding the thermal equilibrium it would have reached without this optical system. This is all accomplished without the need for solar concentrators and limited (if any) power from external sources.

Figure 8:
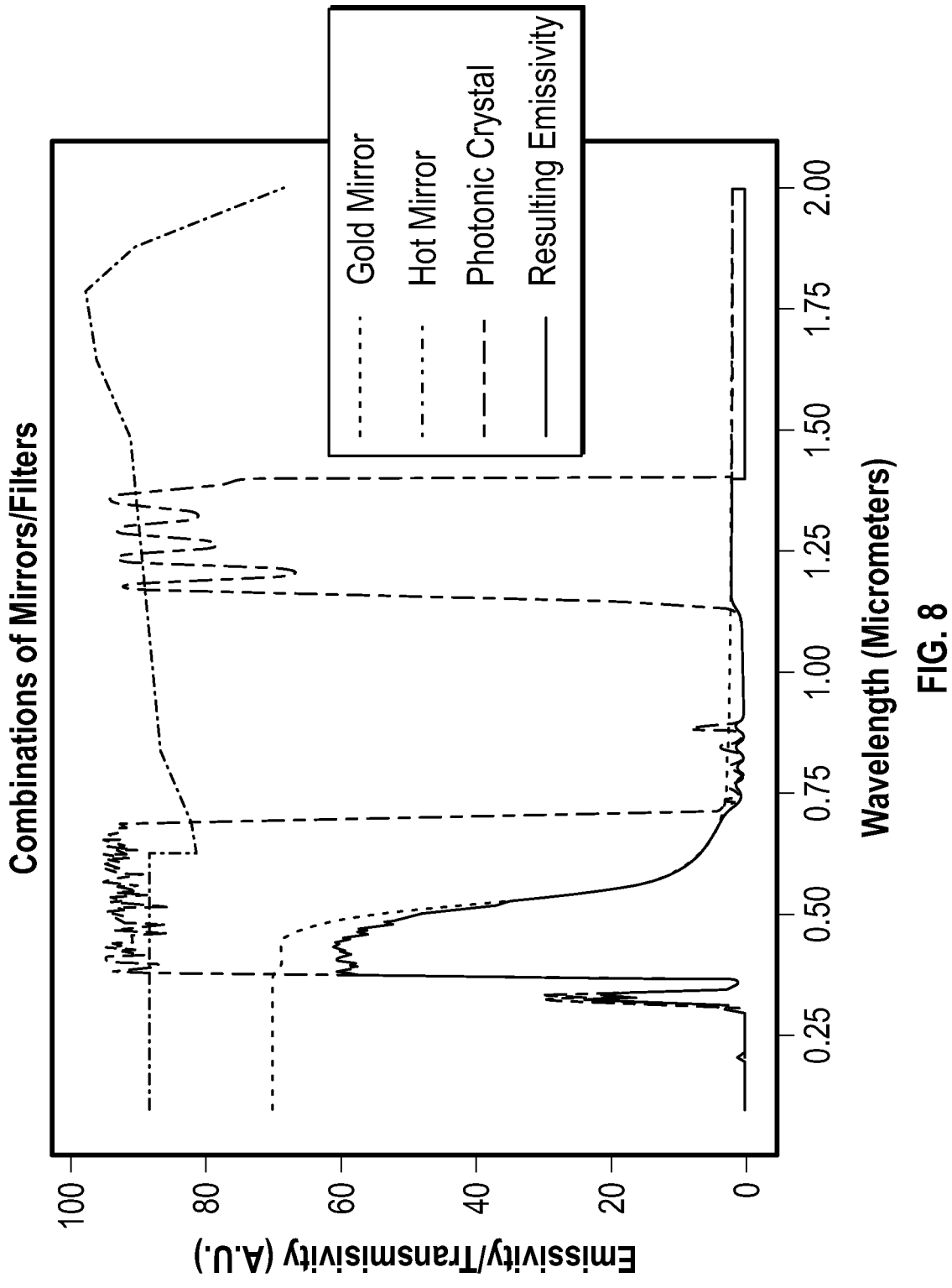
FIG. 8 shows examples of transmissivity gold mirrors, hot mirrors, and photonic crystals.
Figure 9:
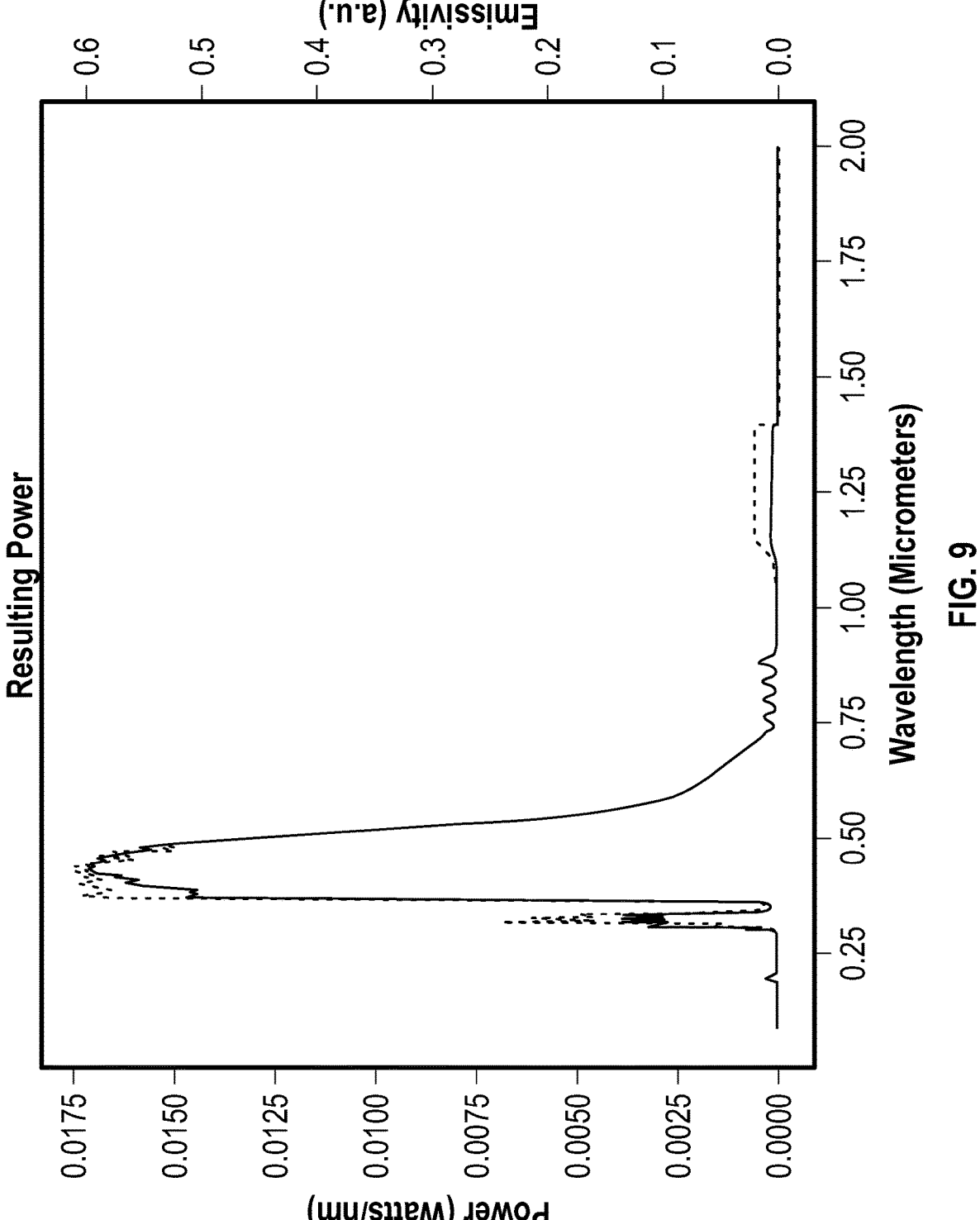
FIG. 9 shows solar thermal power reaching the thermal capacitor after passing through the optical system.

Stacking of the multiple layers of optical mirrors and coupling to the photonic crystal emissivity data allows the optical system to be modeled and thermal performance predicted. The resulting spectrum can be determined from commercially available and proven optical systems as well as empirical data provided by Mesodyne Inc for PhC behavior. The multi layered optical systems were added together utilizing Eq. (1) below.

$$\frac{1}{T} = \frac{1}{T_1} + \frac{1}{T_2} - 1 \tag{1}$$

Where T is the net percent transmission of the system, and $T_1$ and $T_2$ are the transmissions of each of the filters. The transmission can be modeled at each wavelength resulting in the transmission spectrum that passes through the optical assembly. An example of the resulting transmission ranges from a gold mirror, hot mirror, and PhC combination, is shown in FIG. 8. FIG. 8 also shows exemplary transmissivity gold mirrors, hot mirrors, and photonic crystals. When combined, infrared spectral range is reduced significantly while preserving a large portion of high energy wavelengths. The photonic crystals act to severely limit wavelengths beyond 2 microns. Utilizing the resulting emissivity of the optical system, the total solar energy that gets absorbed can be determined. FIG. 9 shows solar thermal power reaching the thermal capacitor after passing through the optical system. Absorbed power because of this system can reach 4.4 W potentially eliminating the need to draw additional power. As shown in FIG. 9, the resulting spectral range and power absorbed by the thermal capacitor is significantly smaller than an equivalent area exposed directly to the solar radiation. However, this does aid in the heating of the thermal capacitor. As explained earlier, the thermal capacitor heats up until it reaches a high enough temperature to radiate shorter wavelengths to release the energy. Once this occurs, the thermal capacitor is in equilibrium. For this exemplary system, the absorbed power is designed to reach 4.4 W. With no losses due to surface abnormalities or other heat transfer methods, the thermal capacitor could heat up to temperatures above 1000° K without power input from the PV array.

However, losses will potentially be introduced through several different factors. The primary loss that is likely to be observed is through conduction with the supporting structure holding the thermal capacitor. In addition, imperfections in the optical system can induce losses as well. Edges and corners of photonic crystal plates provide surfaces for large wavelengths to radiate. While these losses are difficult to predict, the convective heat transfer can be calculated, and the imperfections can be mitigated by increasing the margin of supplied power to account for losses. In one exemplary embodiment, Silica Aerogel insulation spacers separate the thermal capacitor from the rest of the propulsion system to reduce conductive losses, and the PV array around the liquid propellant tank provides ~2.5 W of additional power.

The ThermaSat system is particularly robust in the topic of failsafe operation and redundancy, as the lack of proper execution merely results in decreased performance and not mission failure. Often, these issues can be self-correcting. For example, misalignment of the thermal capacitor with the sun may result in decreased power input but can be rectified by firing the ACS as a cold gas thruster to realign the system. Reduced input is augmented by a small PV array to provide a margin to operate, reducing the need for exact orientation. While blemishes or damage may reduce input energy, this will result only in charging delays.

Figure 10:
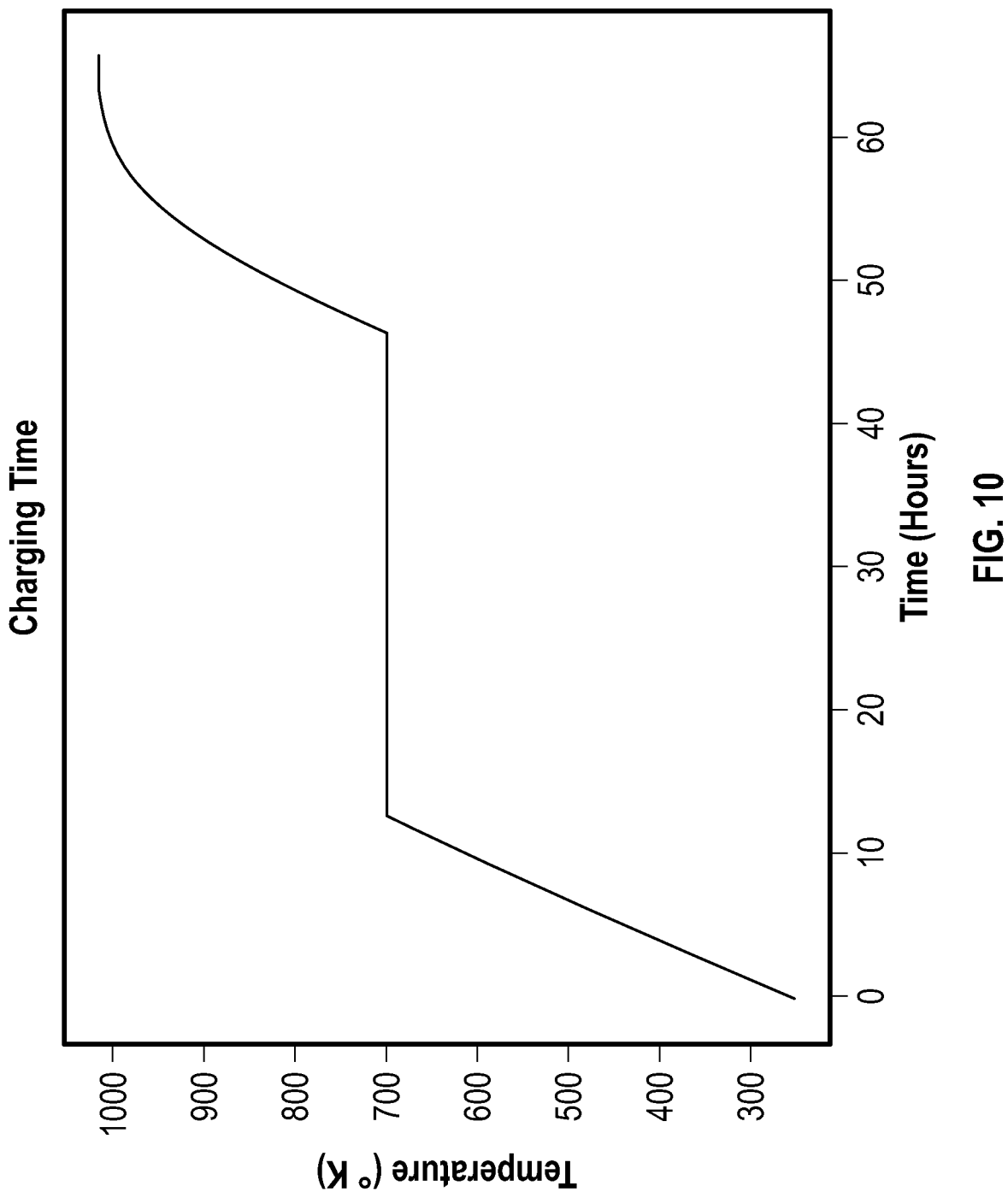
FIG. 10 shows the time required to charge the thermal capacitor using solar power.

In one aspect, the drawback low absorbed energy, and low supplemental power from the spacecraft bus, is a prolonged charging time for the capacitor. FIG. 10 shows the required charging time for the system, including to charge the thermal capacitor using solar power. The flat portion of the graph shows the latent heat zone of the phase change material as it turns from a solid to liquid. Once charged, thermal capacitor can be used multiple times before needing to charge again. More than 45 hours are required to heat the capacitor to its operating temperature in this exemplary scenario, yet once initially charged, the system can fire multiple times and maintain a high operational temperature if not used continuously.

Propulsion Performance Characteristics:

FIG. 11 shows an exemplary resulting temperature, $I_{sp}$, thrust, and $\Delta V$ for a 300 second burn with a 15.4 kg payload. The $I_{sp}$ is dependent on the temperature of the thermal capacitor and can be expressed with the following equation.

$$I_{sp} = \frac{1}{g_o}\sqrt{\frac{2k}{k-1}\frac{R_u T_c}{M}\left[1 - \frac{P_e}{P_c}\right]^{\frac{k-1}{k}}} \quad (2)$$

In this case $g_o$ is the gravitational constant, k is the ratio of specific heats, $R_u$ is the gas constant, $T_c$ is the thermal capacitor temperature, M is the molar mass of the fuel, $P_e$ is the exit pressure, and $P_c$ is the chamber pressure. Using the temperature of the core determined in the previous section and Eq. 3 the thrust can be determined from Eq. 3.

$$F = I_{sp} g_o \dot{m} \quad (3)$$

Where F is the force and $\dot{m}$ is the mass flow rate of the fuel. The standard rocket equation is used to determine the change in velocity and is described in Eq. 4.

$$\Delta V = I_{sp} g_o \ln\left(\frac{m_o}{m_f}\right) \quad (4)$$

Where $m_o$ is the initial mass of the spacecraft, and $m_f$ is the final mass of the spacecraft after the burn. FIG. 11 shows how the temperature decreases due to the fuel extracting energy from the thermal capacitor. This loss of energy causes the thermal capacitor to reduce in temperature and based on Eq. 2 the $I_{sp}$ drops as well. At around 50 seconds, the loss in energy has lowered the temperature of the thermal capacitor to the fusion point of the PCM and maintains a temperature of 700° K. This in turns keeps the $I_{sp}$ at a constant value before the latent heat of fusion is extracted from the thermal capacitor and the temperature begins to decrease. The resulting thrust and $\Delta V$ throughout this process is shown in FIG. 10. A $\Delta V$ of over 60 m/s is possible with this burn duration before the energy of the thermal capacitor is expended.

Figure 11A:
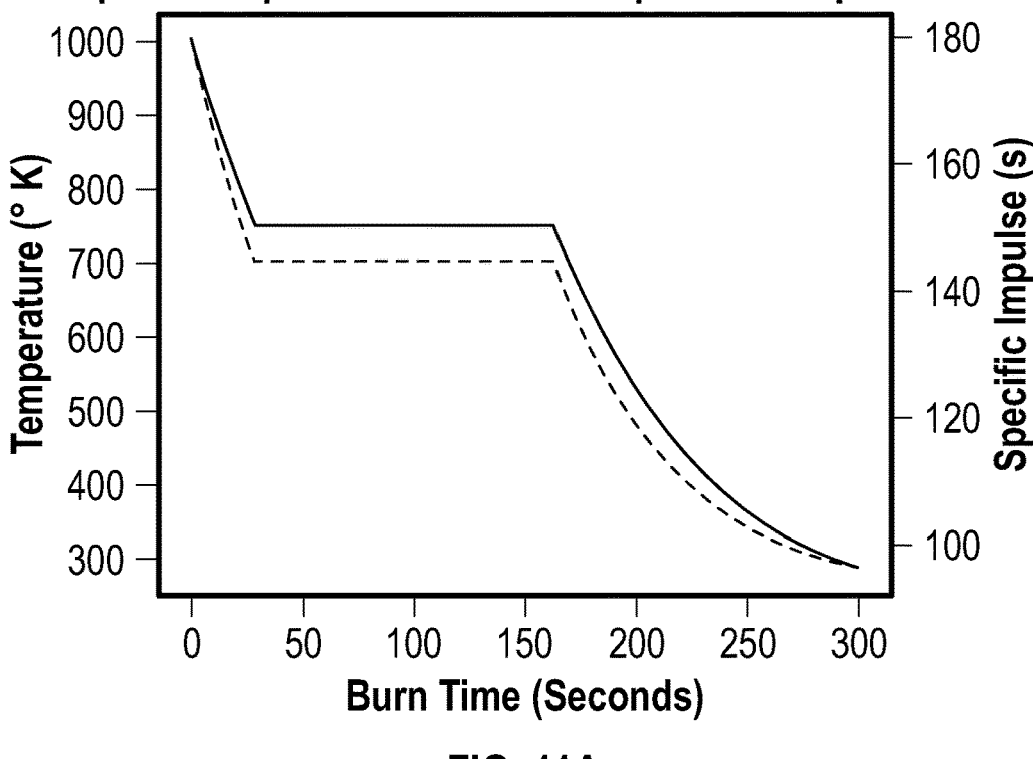
FIGS. 11A and 11B show that the temperature of the thermal capacitor decreases rapidly during operation.
Figure 11B:
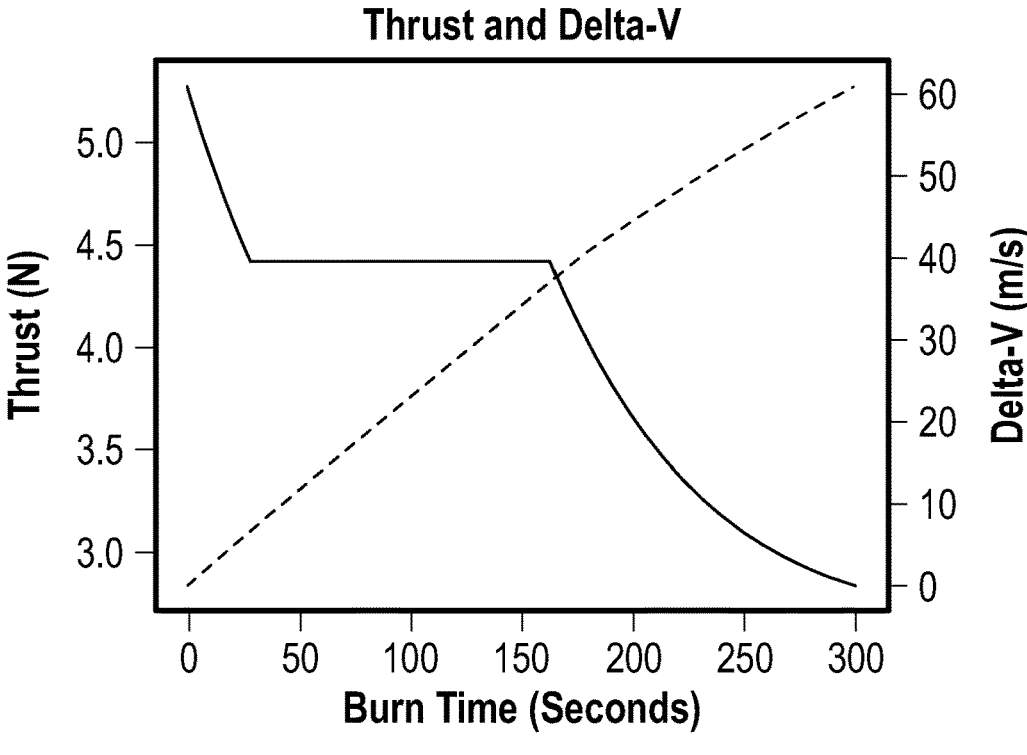

In FIGS. 11A and 11B, the effects on the thrust and $\Delta V$ are visible. As shown, temperature of the thermal capacitor decreases rapidly during operation, however, latent heat of the PCM holds specific impulse, thrust, and temperature steady for an extended period. A decrease of thrust is initially observed due to the temperature quickly dropping to the fusion point of the PCM. The highest performance occurs at the beginning of the burn due to the high temperatures. However, this high impulse and high thrust portion of the burn lasts for only a few seconds. A majority of the $\Delta V$ comes from the stored heat inside the PCM, which significantly aids in the performance of the system. While the water should be transformed into a gas prior to injection into the thermal capacitor, in this exemplary embodiment, the burn duration is limited to shorter intervals below 60 seconds. If a longer burn is desired, the intermediate pressure vessel size would need to increase to store more gaseous steam.

In one exemplary embodiment, with an exemplary amount of a little under 2500 cm³ (2.5U) of liquid fuel volume the propulsion system can provide 200 m/s of $\Delta V$ for a 15.4 kg payload. Operating at the constant 700° K with 30 second burns the ThermaSat propulsion system has an average thrust of 4.4N and an $I_{sp}$ of 150 s.

The ThermaSat system provides all of the propulsive needs of a CubeSat in a modular, predictable, and safe method. The propulsion system will provide impulse burns for simple trajectory calculations and reduced manned operation time. It will also allow for station keeping maneuvers to give the payload a long and predictable lifespan. Finally, at the end of the mission the propulsion system will deliver a final end-of-life burn which deposits the satellite into the atmosphere where it is removed from orbit and does not contribute to excess debris. The table below illustrates the $\Delta V$ budget for each year to achieve these goals for the example CubeSat described above.

TABLE 1

| $\Delta V$ budget for mission, including initial placement, station keeping, and de-orbit. | | | | |
| --- | --- | --- | --- | --- |
| Years in Orbit | Phase Burn (m/s) | Station Keeping (m/s) | Drag Compensation (m/s) | De-orbit Burn (m/s) | $\Delta V$ Remaining (m/s) |
| 1 | 73.4 | 5 | 3 | 0 | 118.6 |
| 2 | 0 | 5 | 3 | 0 | 110.6 |
| 3 | 0 | 5 | 3 | 0 | 102.6 |
| 4 | 0 | 5 | 3 | 0 | 94.6 |
| 5 | 0 | 5 | 3 | 0 | 86.6 |
| 6 | 0 | 5 | 3 | 0 | 78.6 |
| 7 | 0 | 5 | 3 | 0 | 70.6 |
| 8 | 0 | 5 | 3 | 0 | 62.6 |

TABLE 1-continued

| | | | | | |
|---|---|---|---|---|---|
| AV budget for mission, including initial placement, station keeping, and de-orbit. | | | | | |
| Years in Orbit | Phase Burn (m/s) | Station Keeping (m/s) | Drag Compensation (m/s) | De-orbit Burn (m/s) | AV Remaining (m/s) |
| 9 | 0 | 5 | 3 | 0 | 54.6 |
| 10 | 0 | 5 | 3 | 0 | 46.6 |
| 11 | 0 | 5 | 3 | 0 | 38.6 |
| 12 | 0 | 5 | 3 | 30 | 0.6 |

Figure 12:
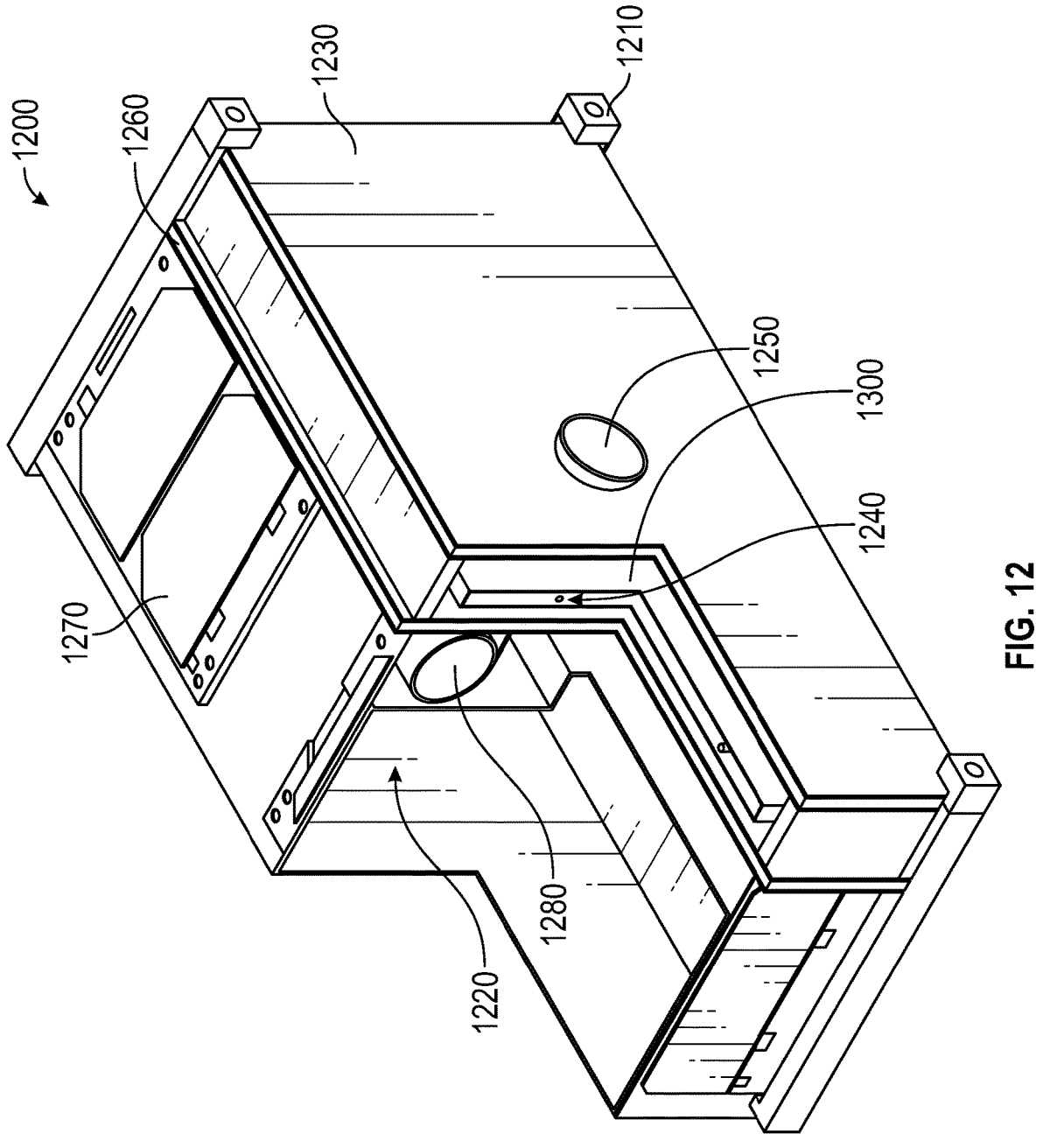
FIG. 12 shows another embodiment of a ThermaSat system capable of high thrust maneuvers.

Another embodiment of an exemplary ThermaSat system is shown in FIG. 12 below. Similar to the system detailed above, the ThermaSat shown in FIG. 12 is a solar thermal propulsion system for a CubeSat that allows for rapid maneuvering for spacecraft, including in the 8-50 kg range. Where traditional solar thermal power systems require a large protruding concentrator to focus solar energy onto a point to directly heat the propellant stream, which causes rapid heating and expansion of the propellant to produce thrust, ThermaSat utilizes a novel optical system to heat a thermal capacitor via solar energy. With little to no power input from the spacecraft bus, ThermaSat can reach temperatures in excess of 1000K with 1N of thrust and over 200 s of specific impulse. Some of the advantages of such a system include:

1. Little to no power draw reduces requirements from spacecraft bus to provide power for the system.
2. Harmless and low-pressure water propellant reduces safety concerns during integration, launch, and operations around ISS or other spacecraft.
3. Simplistic design with few moving parts reduces complexity and potential failure points.
4. Rapid maneuverability to avoid orbital debris and other satellites
5. Orbital station keeping to:
    a. Compensate for drag to increase orbital lifetimes.
    b. Constellation maintenance to maintain proximity.
    c. Enable lower orbits for increases in image resolution proportional to altitude.
    d. Enable ionosphere missions to explore novel environments.
6. Deorbiting of satellite at end of lifetime.
7. Low RF interference from propellant
8. Optional co-location within ThermaSat of components such as command and control boards, ACS, radios, etc.
9. Thermally isolated from the rest of the spacecraft bus.

Figure 13:
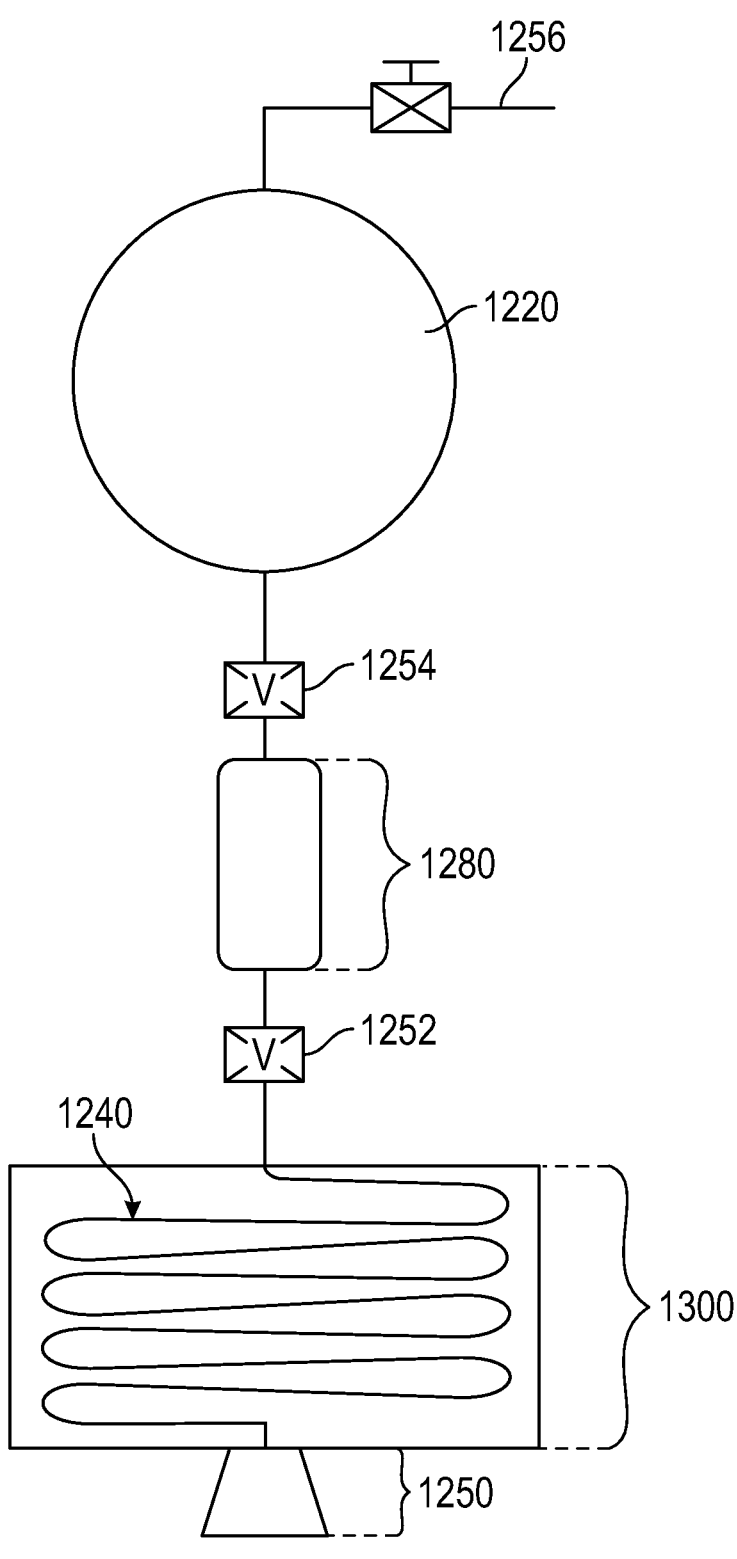
FIG. 13 shows the propulsion system of the embodiment of FIG. 12.

In one exemplary embodiment, the baseline ThermaSat system fits within a 2U structure providing high thrust and total impulse to 6U and larger spacecraft. ThermaSat thus occupies 2U of space on board a 6U satellite, leaving 4U for other bus components and payload. In one exemplary configuration, the ThermaSat system has the following properties:

Operating phase change material (PCM) temperature: 1,052K
Thrust: 1.02N
Specific Impulse: 203.1 N
Total Impulse: 1,800 Ns
Minimum Impulse Bit: 0.04-0.1 Ns
Maximum Impulse Bit: 60 Ns
Wet Mass: 2,445 g
Dry Mass: 1,445 g FIG. 12 shows a rendering of the ThermaSat propulsion system which is capable of high thrust maneuvers with 203 s of specific impulse and 1.02N of thrust. The golden optical system on the bottom (1230) allows for high temperature operation and high performance. FIG. 12 also shows ThermaSat 1200 with supporting structure 1210, propellant tank 1220, optical fibers 1230, flow channel 1240, IN nozzle 1250, insulating material 1260, surface mounted solar panels 1270, and intermediate pressure vessel 1280. FIG. 13 shows the propulsion schematic with various pressures and temperatures, with the diagram showing a fill valve 1256 connected to liquid water tank 1220 (shown in this example at 101.325 Pa). The tank 1220 is connected by a valve 1254 to intermediate pressure vessel 1280 (shown in this example at 311.870 Pa and 408K). The intermediate pressure vessel 1280 is connected by a valve 1252 to high temperature thermal capacitor 1300 (shown in this example at 1052K) which includes flow channel 1240 and which is connected to nozzle 1250. The diagram of the ThermaSat propulsion system shown in FIG. 13 includes various temperatures and pressures within the system, but none of the pressures exceed 1 atm to ensure low stresses prior, during, and after launch. In at least one exemplary embodiment, the liquid water tank is pressured to 1 atm at launch. During the operation of the thruster, an intermediate pressure vessel is used to pressurize the propellant prior to introducing it to the thermal capacitor to produce high thrust. A long flow channel within the thermal capacitor is used to heat the propellant, in at least one exemplary embodiment, to its maximum operating temperature of 1,052 K before expanding it out of nozzle. In at least one exemplary embodiment, ThermaSat is rated to fire up to 60 s for high impulse and rapid maneuvers. Smaller impulse bit maneuvers are available to desaturate reaction wheels. This wide range of impulse bits is made possible by the thermal capacitor which has a much larger specific power density than batteries. Having few moving components ensures the simplicity of the propulsion system. Sensors can also be attached to various components of the propulsion system to monitor its health during operation.

Figure 14:
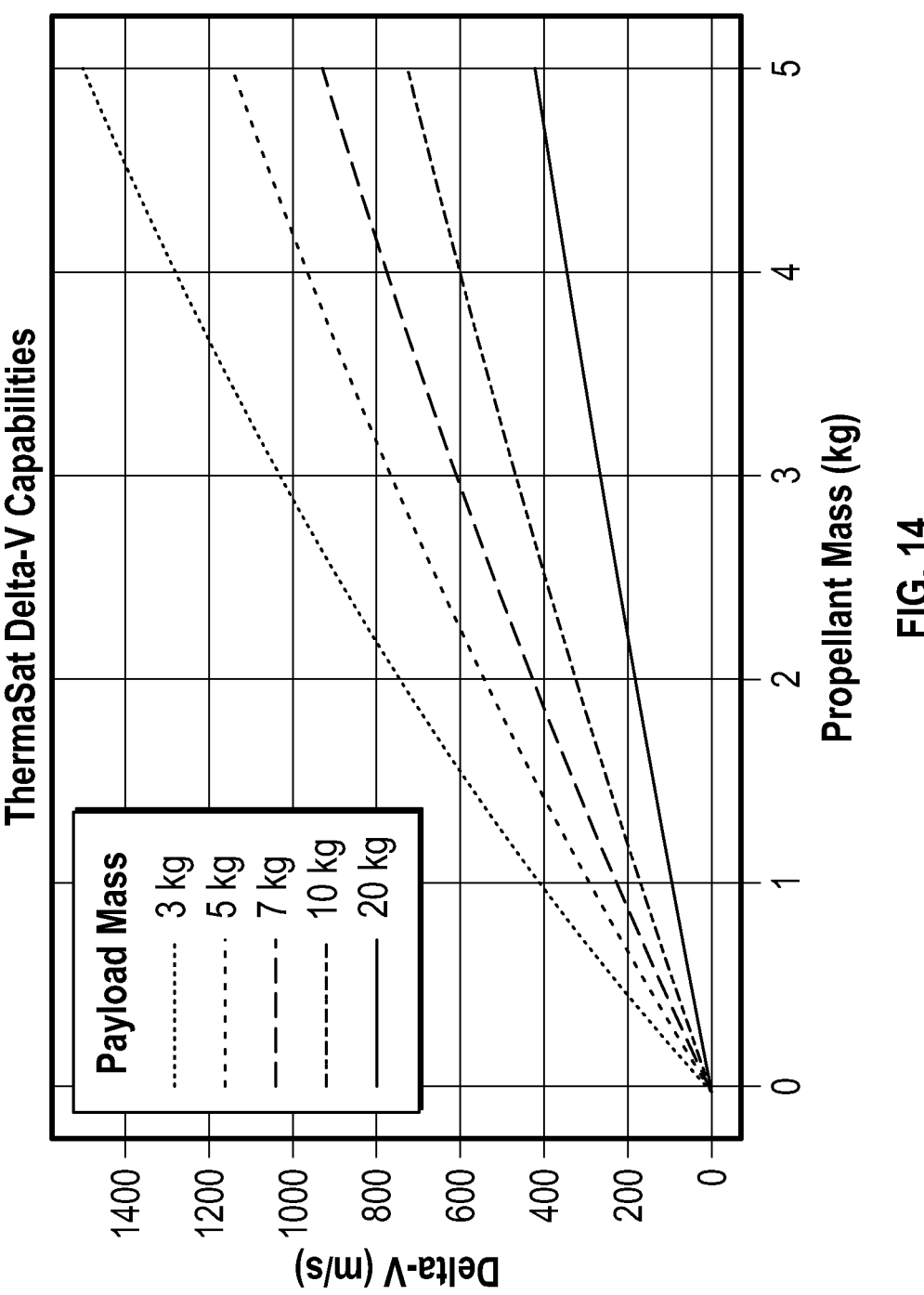
FIG. 14 shows Delta-V capabilities of the ThermaSat system with varying amounts of propellant.

In at least one exemplary embodiment, the standard propellant tank onboard ThermaSat contains ~1 kg of propellant. Additional, or smaller propellant tanks can be customized to match a variety of delta-v requirements. FIG. 14 shows the performance of various payload sizes and propellant masses for various payload sizes. Additionally, FIG. 14 shows Delta-V capabilities of the ThermaSat with varying amounts of propellant. Payload mass comprises the dry mass of the spacecraft bus that ThermaSat will transport. In this case "payload" refers to everything that is not the propulsion system (bus components, science payload, structure etc.). Co-location of components is possible with lower delta-v requirements as propellant tank size can be scaled down.

One key to the ThermaSat system's success is its novel optical system which allows the thermal capacitor to reach its operational temperature. This system comprises several natural and custom selective emitters which creates a favorable non-Planckian radiation spectrum to reach temperatures in excess of 1,000K via direct solar energy. The optical system allows for extremely specific wavelengths to pass through, and it rejects wavelengths outside of this region, primarily in the infrared range. As the thermal capacitor heats up due to the sun's energy, it begins to emit light in the infrared region. However, because of the novel optical design, these wavelengths cannot be transmitted through the optical system. This causes the thermal capacitor to increase in temperature and radiate at shorter and shorter wavelengths until the energy input into the system is equal to the energy output. The optical system and thermal capacitor are thermally isolated from the rest of the spacecraft, e.g., via high temperature ceramics. This ensures minimal heat transfer to the rest of the spacecraft body to prevent damage to vital bus components The primary propellant tank stores the liquid water for the propulsion system. As the liquid water is non-pressurized at launch, this system poses no threat to the launch vehicle and other spacecraft onboard making it suitable for a ride sharing missions. A second intermediate pressure vessel is used to store propellant for the burn. This vessel holds enough propellant for the firing of the thruster. In at least one exemplary embodiment, it is heated passively by the thermal capacitor to 408K. This pre-heats the propellant, pressurizing the tank and ensures there will be no back flow of propellant during operation. The heated propellant is introduced in the thermal capacitor flow channel, which winds its way through the thermal capacitor to ensure it reaches high temperatures. A nozzle that protrudes out of the optical system and thermal capacitor expands this steam into the vacuum of space to produce thrust.

Charging of the thermal capacitor is dependent on several factors, including the angle of incidence to the sun, position of the propulsion system on the spacecraft, orbit, and pointing regime. In most cases, the thermal capacitor can be charged to operational temperatures via direct solar energy and, when needed, side mounted solar panels with no electrical input from the primary spacecraft bus.

Figure 15:
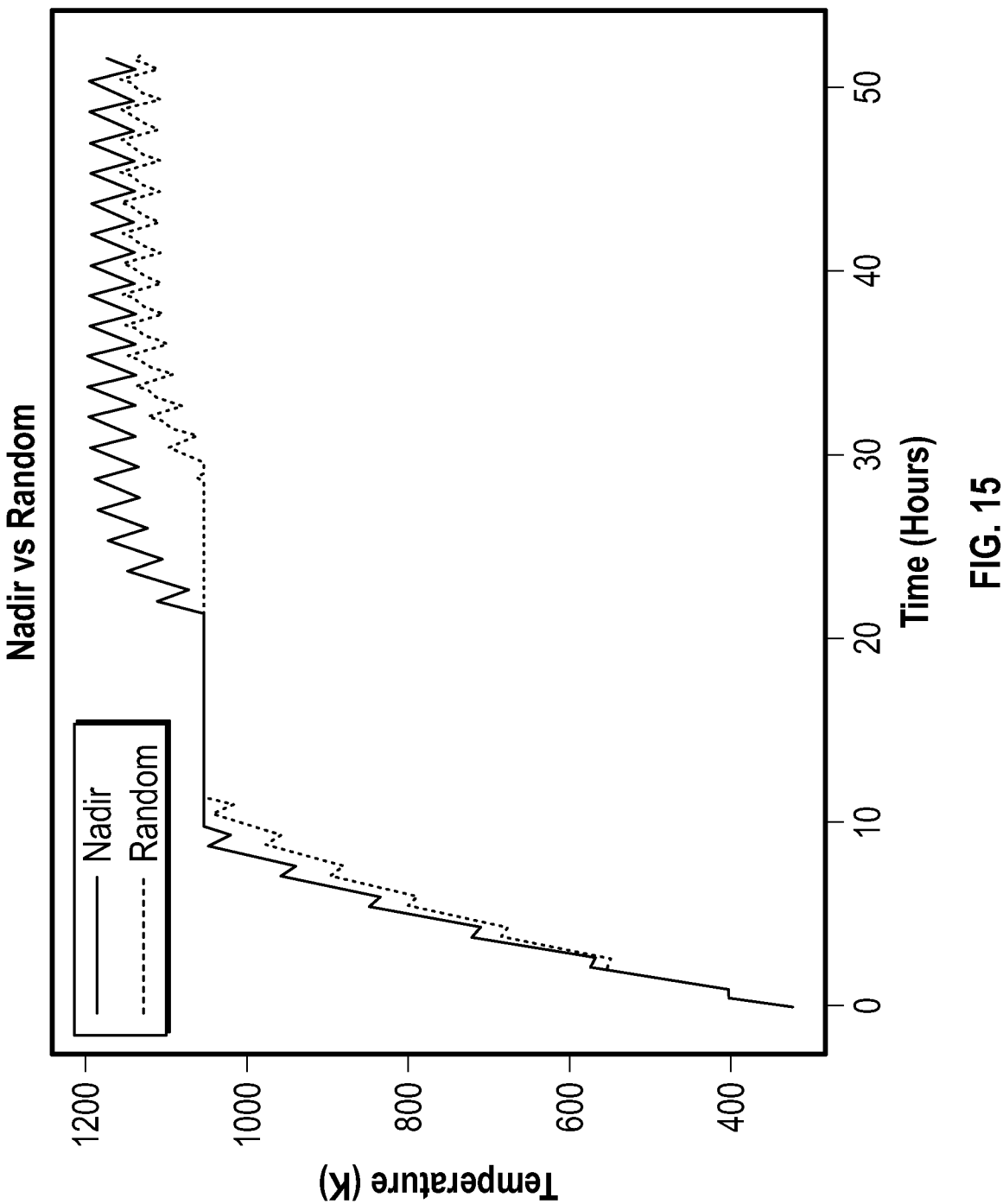
FIG. 15 shows an exemplary mission of a 6U spacecraft with nadir and random pointing regimes.

Aligning the propulsion system with the CubeSat's primary solar array will allow the propulsion system to charge while the spacecraft also receives power from the sun. This becomes much easier if the spacecraft is in a sun synchronous orbit. While this is a highly desirable orbit, nadir, random, and sun pointing missions in low earth orbit (LEO) can operate without hindering the mission in a significant manner, which is shown in FIG. 15. FIG. 15 provides an example mission of a 6U spacecraft with nadir (Earth facing) and random pointing regimes. Enough power is generated via direct solar energy and side mounted solar panel input to charge the system. Dips in the graph represent eclipse times where the thermal capacitor is only radiating energy, not absorbing. Pointing regimes will affect the maximum temperature achievable by the thermal capacitor. Side mounted solar panels are included to aid the thermal capacitor during these pointing regimes; however, the power input is minimal compared to other thrusters available.

Figure 16:
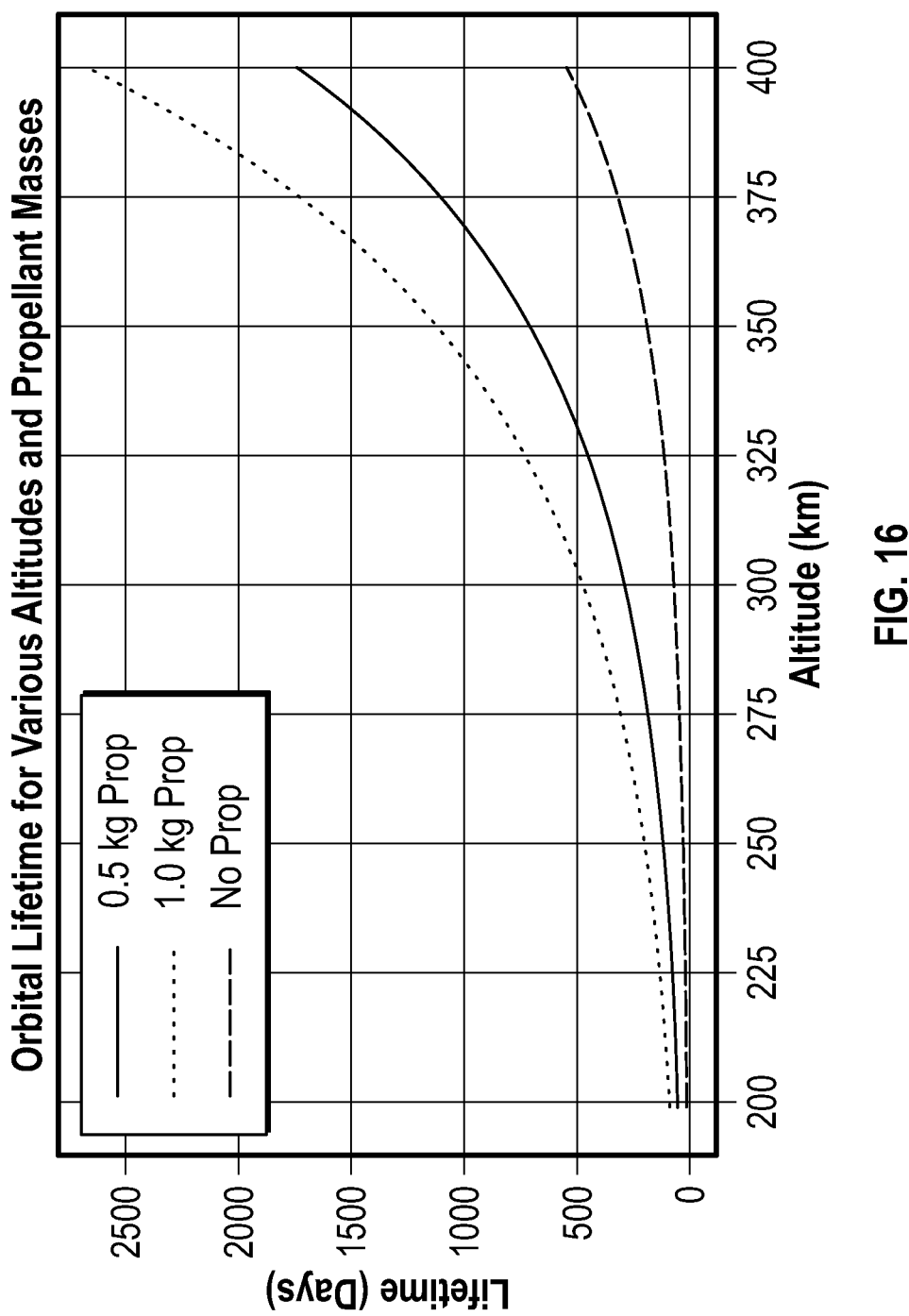
FIG. 16 shows a lifetime chart of an 8 kg 6U spacecraft for various altitudes.

There are many ways to use a propulsion system in orbit. ThermaSat is highly capable and can be used for several different mission scenarios. One exemplary use case is to perform station keeping for a satellite in LEO, particularly under 400 km. There are several advantages to decreasing orbital altitude, such as an increase in total communication throughput and increases in resolution for remote sensing satellites. FIG. 16 shows how ThermaSat can increase orbital lifetimes with little to no electrical input from the spacecraft bus. As shown in FIG. 16, the lifetime of an 8 kg 6U spacecraft with 0.02m2 drag area for various altitudes with and without various amounts of propellant is shown. In this example, a 6U satellite was used with the Jacchia-Roberts Drag model NASA's General Mission Analysis Tool (GMAT) to simulate the orbital decay of the spacecraft, with a 200 cm$^2$ surface area representing the smallest front face of a 6U 8 kg dry mass CubeSat in a constant nadir pointing regime (largest 6U face towards Earth). The satellite's altitude was corrected every time its altitude dropped below 20 km of its original position.

ThermaSat can extend spacecraft lifetime significantly at various altitudes, which has many benefits and enables various missions.

In one example, satellite operators can drop their altitudes and match their previous lifetime at a lower altitude to get higher image resolution. If future FCC regulations further limit CubeSat lifetimes in common orbits, including, e.g., around 600-1000 km over North America, equatorial orbits, etc., this could be highly advantageous as one could maximize their lifetime in a lower orbit for higher data rates and better data resolution. Constellations, or arrangements of satellites, including arrangements that do not noticeably change in shape, can also save significant amounts of money by keeping their satellites in orbit for longer periods of time with the ThermaSat. This saves on all repeated costs associated with replenishing and maintaining a constellation.

Studies in the various locations of the relatively unexplored ionosphere region can also be extended. While extremely low ionosphere studies are still difficult, there is a substantial increase in the time one can remain in these areas of interest. Temporal based studies are also important for various missions such as astronomy and astrophysics. Maintaining long orbit lifetimes allows for users to get much more out of their satellite, this is especially important for missions with high value and high cost payloads.

Figure 17:
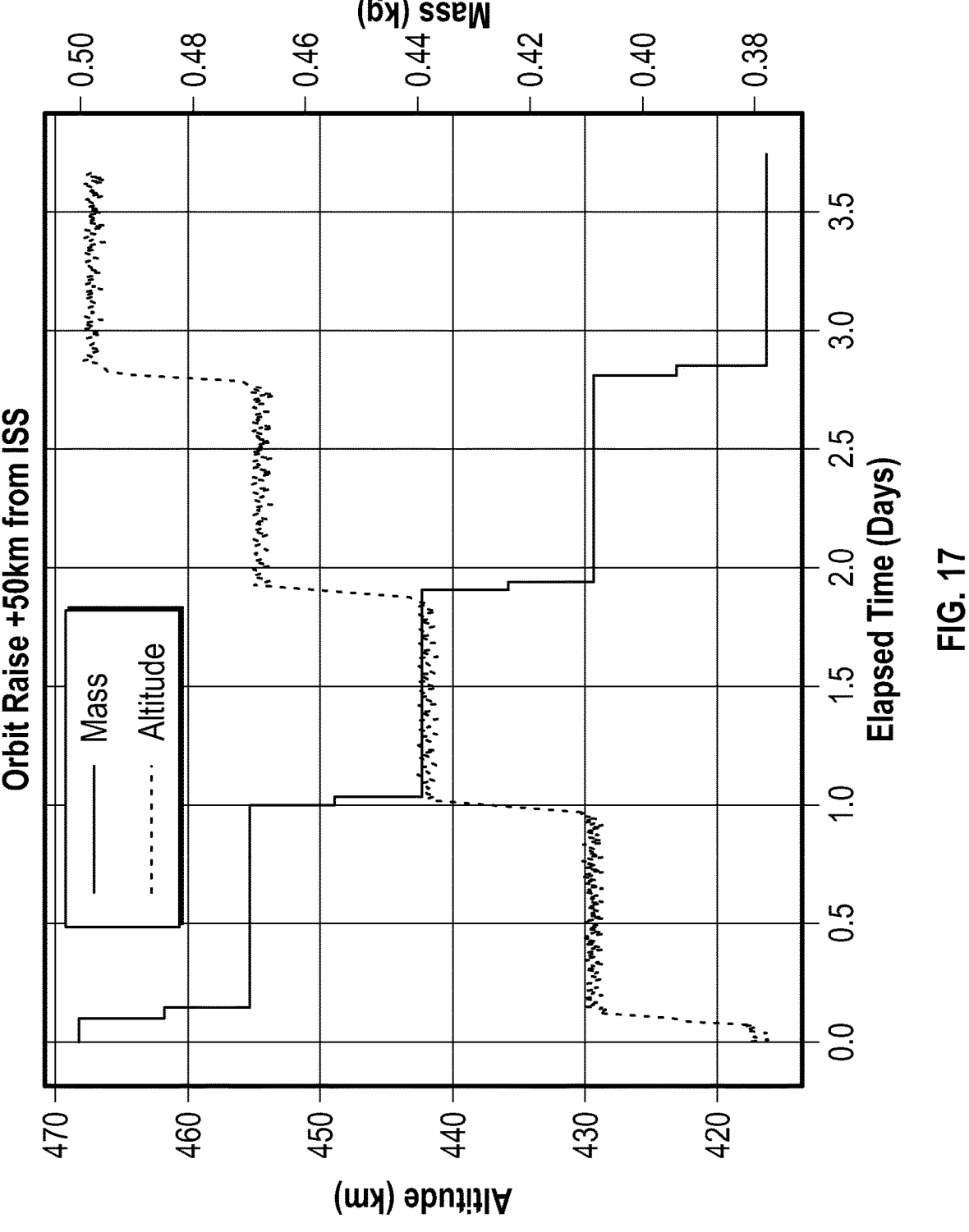
FIG. 17 shows altitude change and propellant mass of a 6U CubeSat launched from the ISS.

Orbit Raise (from ISS):

Another area of interest is changing one's orbit from the initial launch location. One such example would be departing from the ISS and increasing altitude to prevent decay and offer more mission flexibility. Accomplishing this is a simple task but requires a special propulsion system that does not contain pressurized containers, hazardous propellants, or large batteries. These are all to prevent any accidents that would occur on the International Space Station (ISS). ThermaSat matches these values perfectly and can perform high impulse maneuvers to ensure it leaves ISS orbit quickly. Such a mission is visible in FIG. 17 depicting launch from an ISS orbit and raising the satellite's orbit by 50 km. FIG. 17 shows altitude change and propellant mass of a 6U CubeSat launched from the ISS. Because raising a satellite's orbit beyond its original insertion expands capabilities for that satellite, ThermaSat is unique in that it contains no pressurized containers, hazardous materials, or large batteries for its propulsion system. In one exemplary embodiment, it can reach a 50 km difference in altitude in days, with propellant to spare for the duration of the mission to perform additional station keeping and eventual deorbit.

In one exemplary embodiment shown in FIG. 17 takes just over three days for the altitude of the ThermaSat to raise 50 km. This includes the expected charging time at that altitude for a nadir pointing mission. If the mission was sun pointing there is a potential for even faster deployment. In this configuration, only a small fraction the 0.5 kg propellant is used to perform this maneuver leaving extra for station keeping and eventual deorbit if the satellite will not naturally decay within the FCC's allocated window.

Orbit raising can be used at other altitudes as well to modify the original insertion orbit to achieve missions that are not entirely dependent on the primary payload of the launch vehicle. ThermaSat is capable of large altitude changes and can perform limited inclination changes for satellites.

ThermaSat can also be used to rapidly deploy a constellation in the same orbit to ensure they have the same phasing between each satellite. This can significantly decrease the time required to deploy a functioning constellation compared to variable drag separation. ThermaSat can deploy a constellation without sacrificing satellite lifetime due to variable drag methods.

Figure 18:
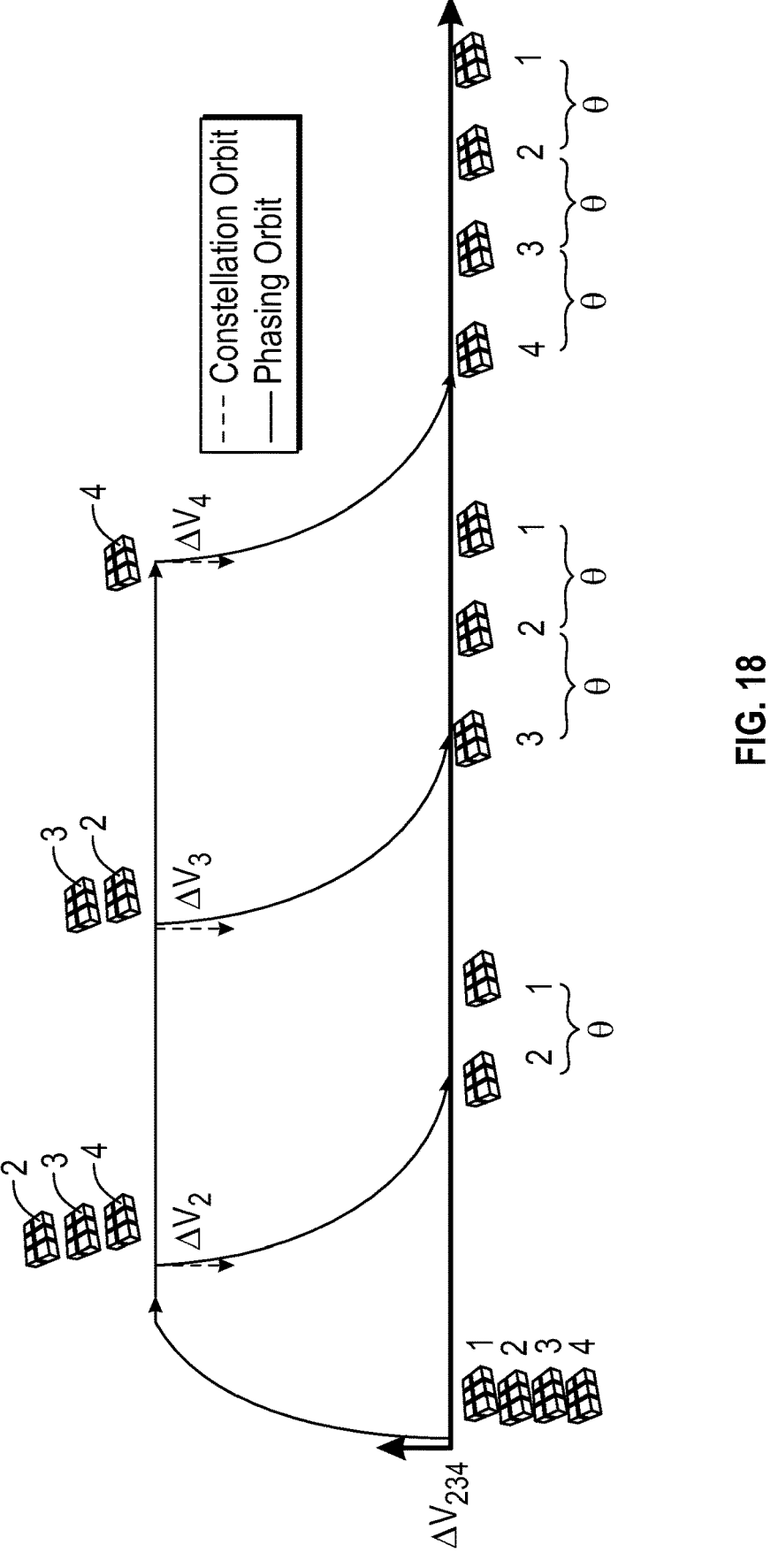
FIG. 18 shows example constellation deployment of several satellites to an orbit with equal phasing between each satellite.

Deploying a constellation is a simple matter of using a phasing orbit to achieve the required phase difference for the satellites. An example is illustrated in FIG. 18, showing example constellation deployment of several satellites to an orbit with equal phasing between each satellite. ThermaSat's high thrust and specific impulse allows the constellation to reach the correct phase angle quickly decreasing total time required to deploy the constellation. The time it takes for the satellite to reach the correct phase angle is dependent on the delta-v imparted. With up to 1,800 Ns of total impulse, ThermaSat can phase a constellation of CubeSats rapidly and with propellant to spare for station keeping and other future maneuvers.

Three exemplary versions of ThermaSat enable more missions and serve different satellites and include ThermaSat, ThermaSat Plus (TS+), and ThermaSat Lite. The ThermaSat Lite is a scaled down version of the ThermaSat system and includes a 1U propulsion system that can be used in 3U satellites for propulsion and includes virtually identical features to the ThermaSat system, only with a lower total impulse due to the reduced size. Charging times for the ThermaSat Lite configuration remain relatively consistent with the baseline ThermaSat model.

Figure 19:
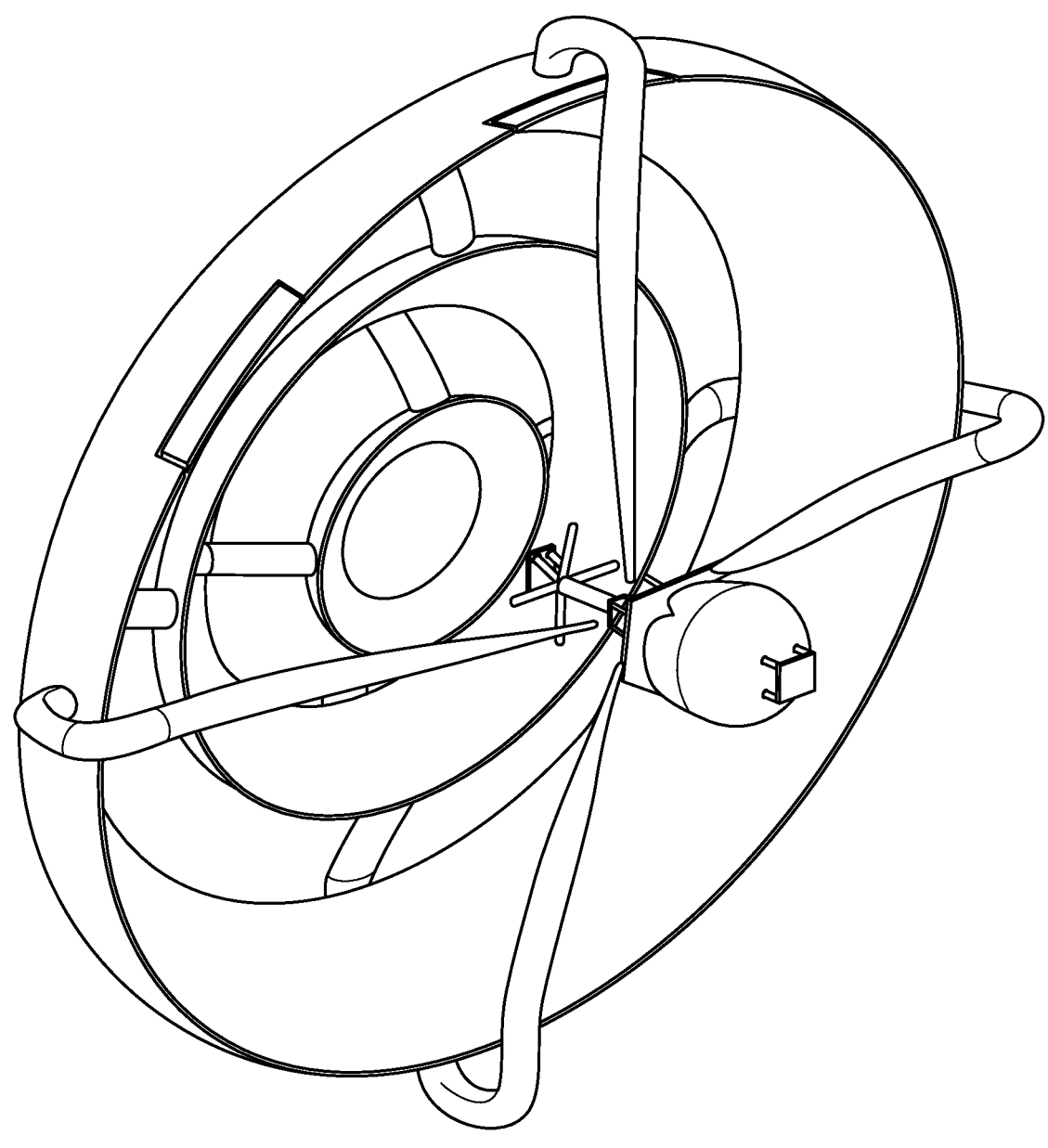
FIG. 19 shows a ThermaSat Plus configuration with deployable solar thermal concentrator.
Figure 20:
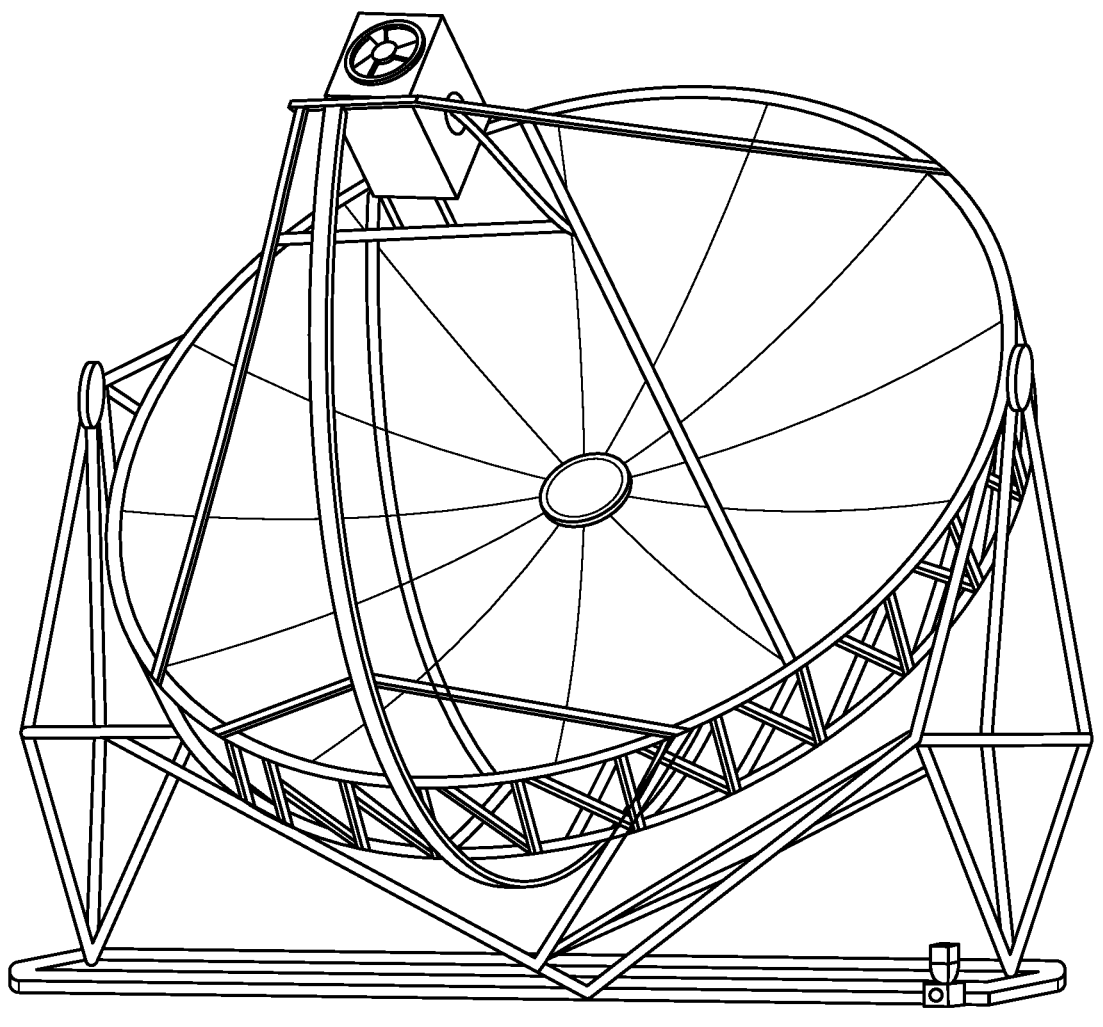
FIG. 20 shows a solar dish collector.

TS+ is a much larger version than the baseline ThermaSat and is shown in FIG. 19. FIG. 19 shows ThermaSat Plus configuration with deployable solar thermal concentrator for high specific impulse maneuvers with hydrogen as a propellant. In one exemplary embodiment, it utilizes hydrogen as the propellant and uses a solar concentrator to focus light onto the thermal capacitor and optical system. In this exemplary embodiment, its operating temperature is 2,500 K enabling a specific impulse of 858 seconds. These features make it favorable for highly efficient maneuvers to achieve larger changes in velocity including geostationary transfers, and lunar missions from LEO. One such example mission for TS+ is the establishment of a Lunar GPS constellation in a 24:6:1 Walker-Delta Constellation. Such a spacecraft would be capable of transporting itself from a LEO parking orbit to the moon forming a GPS network for future missions on the lunar surface. TS+ can also be used in a parking orbit for rapid response missions, such as asteroid intercepts and other objects of interest.

Figure 21:
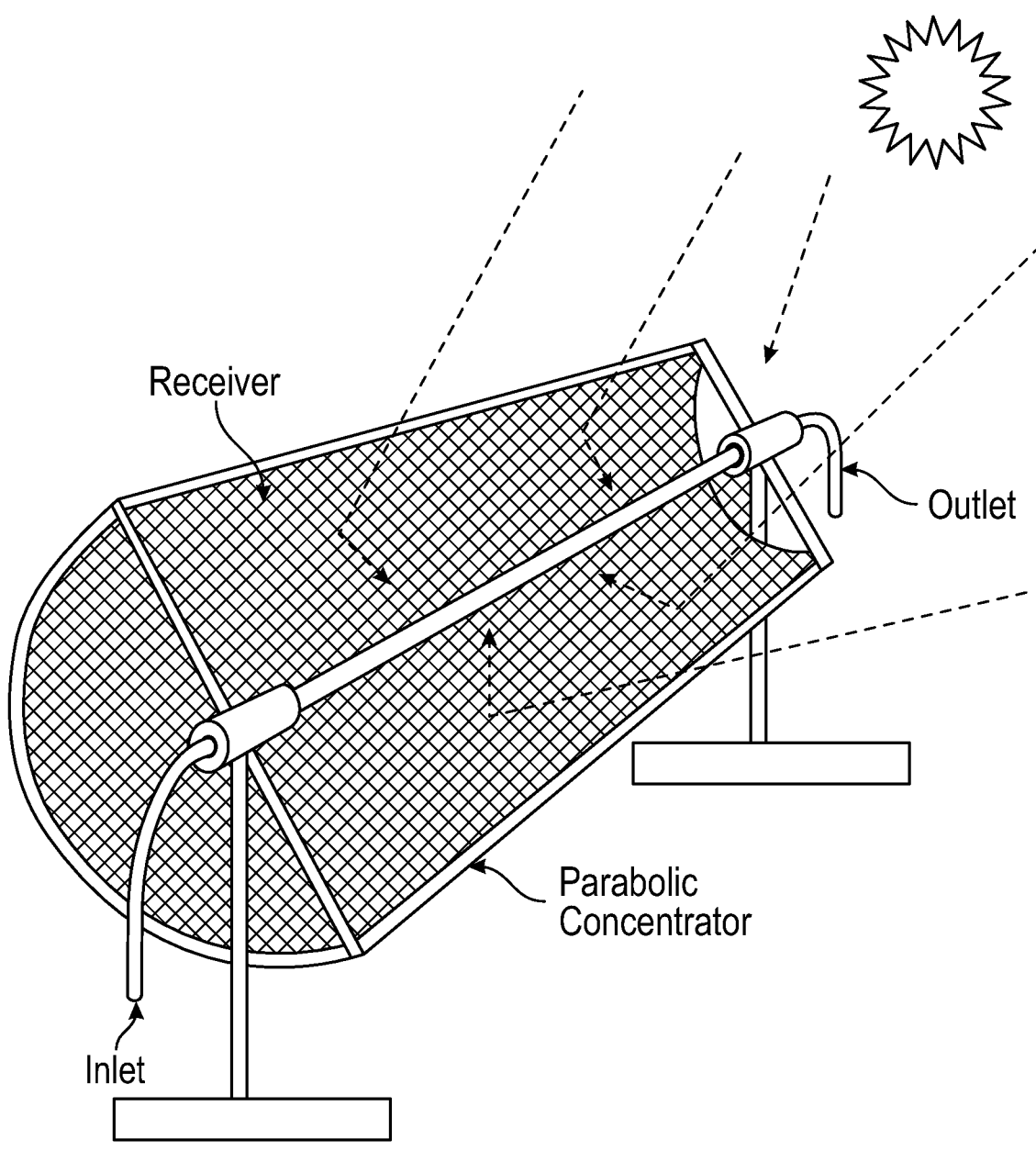
FIG. 21 shows a trough collector.
Figure 22:
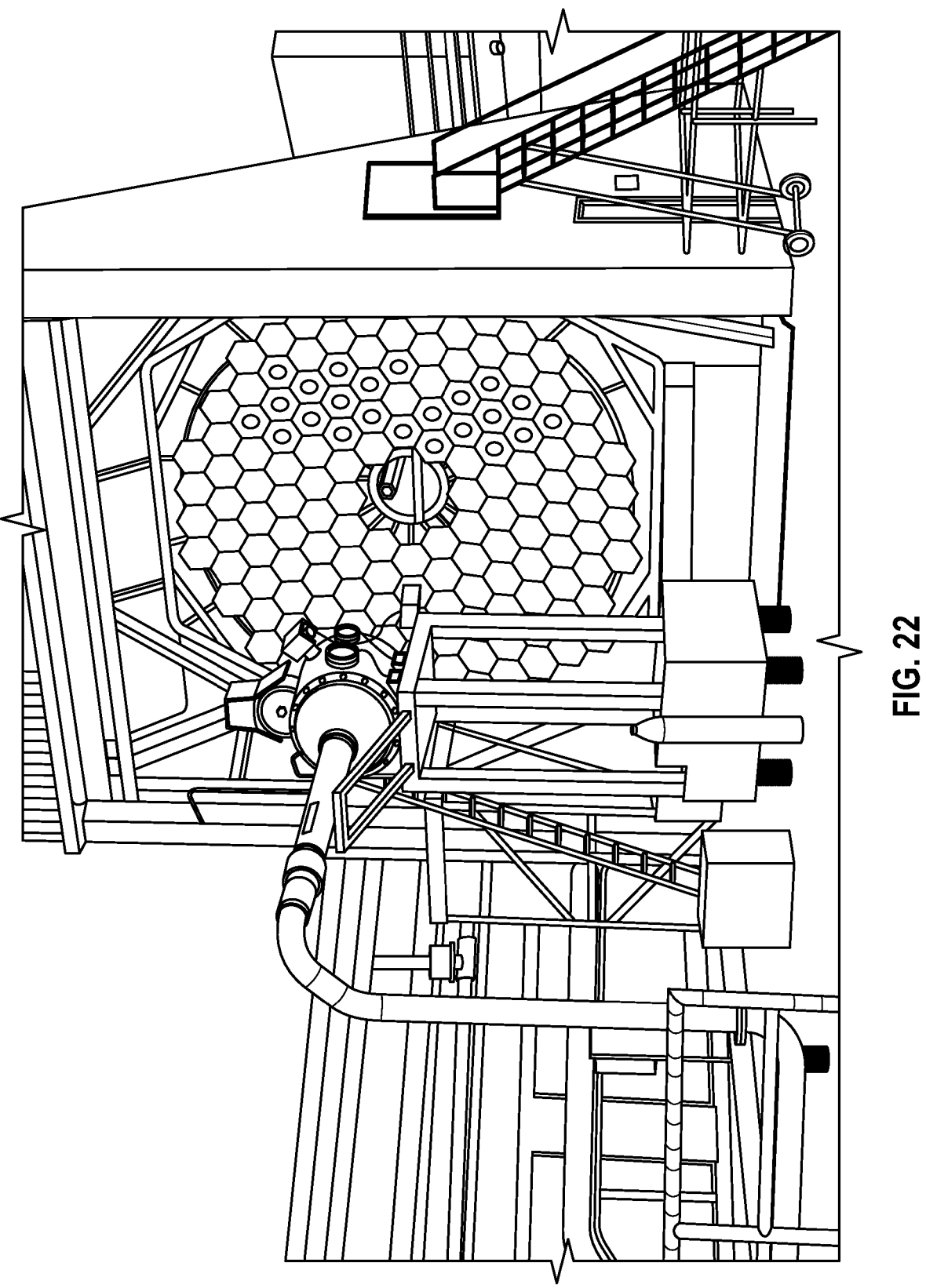
FIG. 22 shows a flat or paneled collector.
Figure 23:
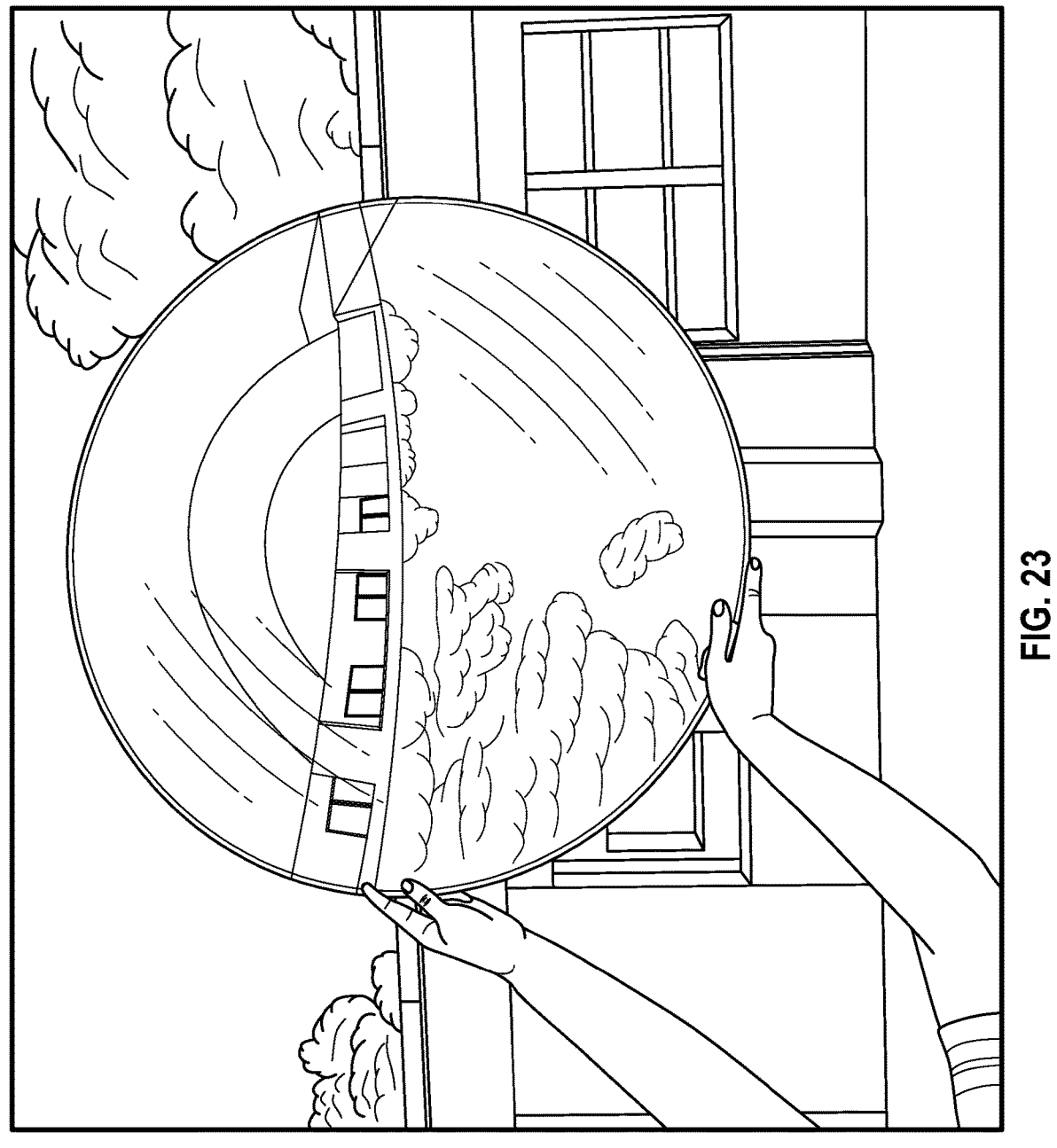
FIG. 23 shows a lens collector.

FIGS. 20-23 show solar concentrator designs with which one could use focused solar in conjunction with ThermaSat, in embodiments where a concentrating device is to be included in the design. Solar concentrators may include dishes (parabolic, spherical, or otherwise), such as the configuration shown in FIG. 20 (see also https://www.alternative-energy-tutorials.com/solar-hot-water/solar-dish-collector.html). FIG. 21 shows a trough collector (see also https://www.sciencedirect.com/science/article/abs/pii/S0167732216307383). FIG. 22 shows a flat or paneled collector (see also https://www.nasa.gov/topics/solarsystem/features/10-144.html). FIG. 23 shows lenses (Fresnel, spherical or curved) as collectors (see also http://www.meiyingoptics.com/quality-10993018-round-600mm-big-fresnel-lens-1-meter-fresnel-lens-fresnel-lens-solar-cooker-fresnel-lens-price-spot).

Figure 24:
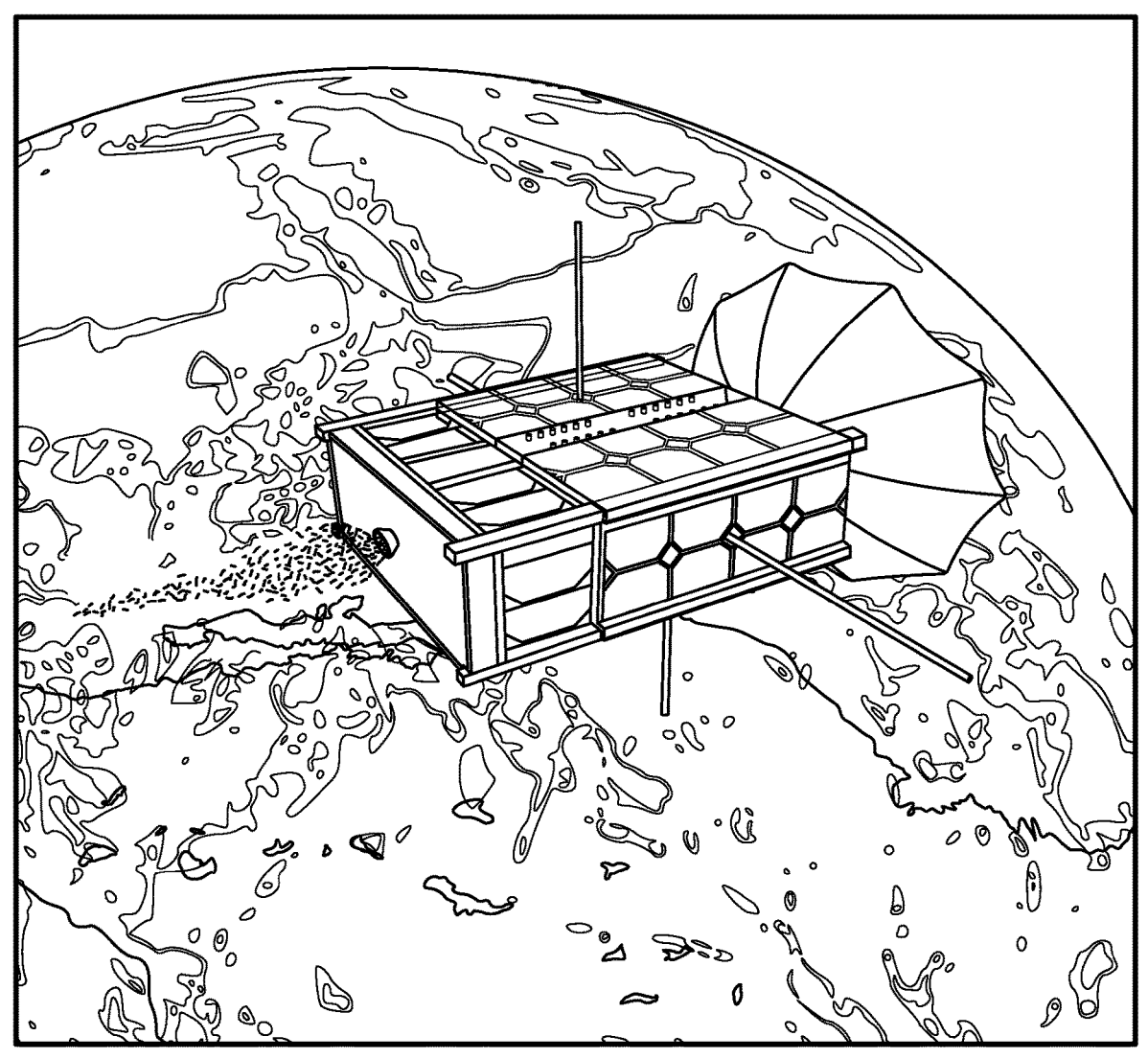
FIG. 24 shows a ThermaSat CubeSat propulsion system.

In another exemplary embodiment, FIG. 24 shows a ThermaSat CubeSat propulsion system. The standard ThermaSat is a small satellite propulsion system which has no deployable collectors. In contrast, a ThermaSat Plus includes a ThermaSat Plus high performance CubeSat propulsion using inflatable concentrators (see, e.g., FIG. 19).

Figure 25:
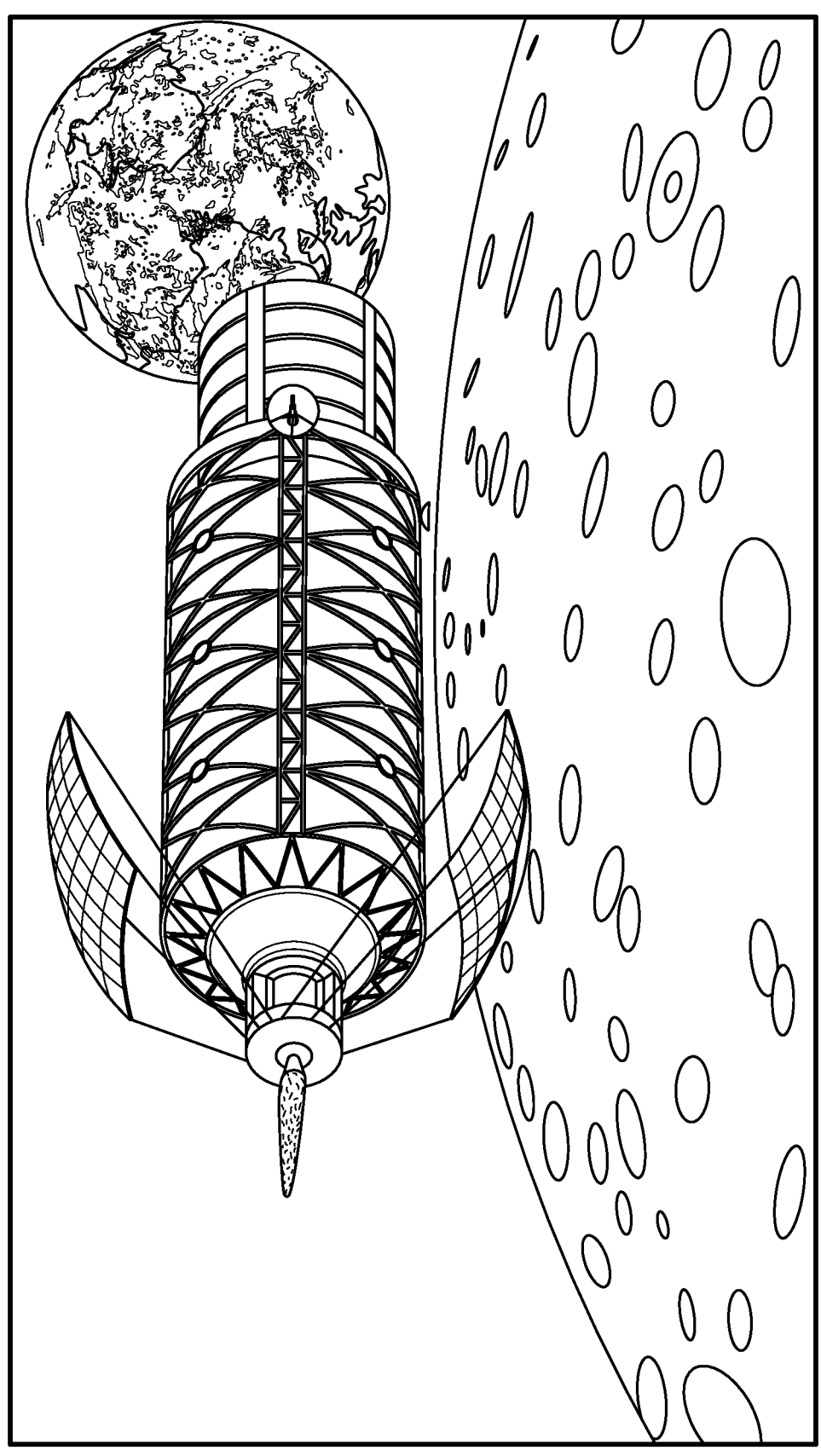
FIG. 25 shows a ThermaSat Plus on a large scale ship.
Figure 26:
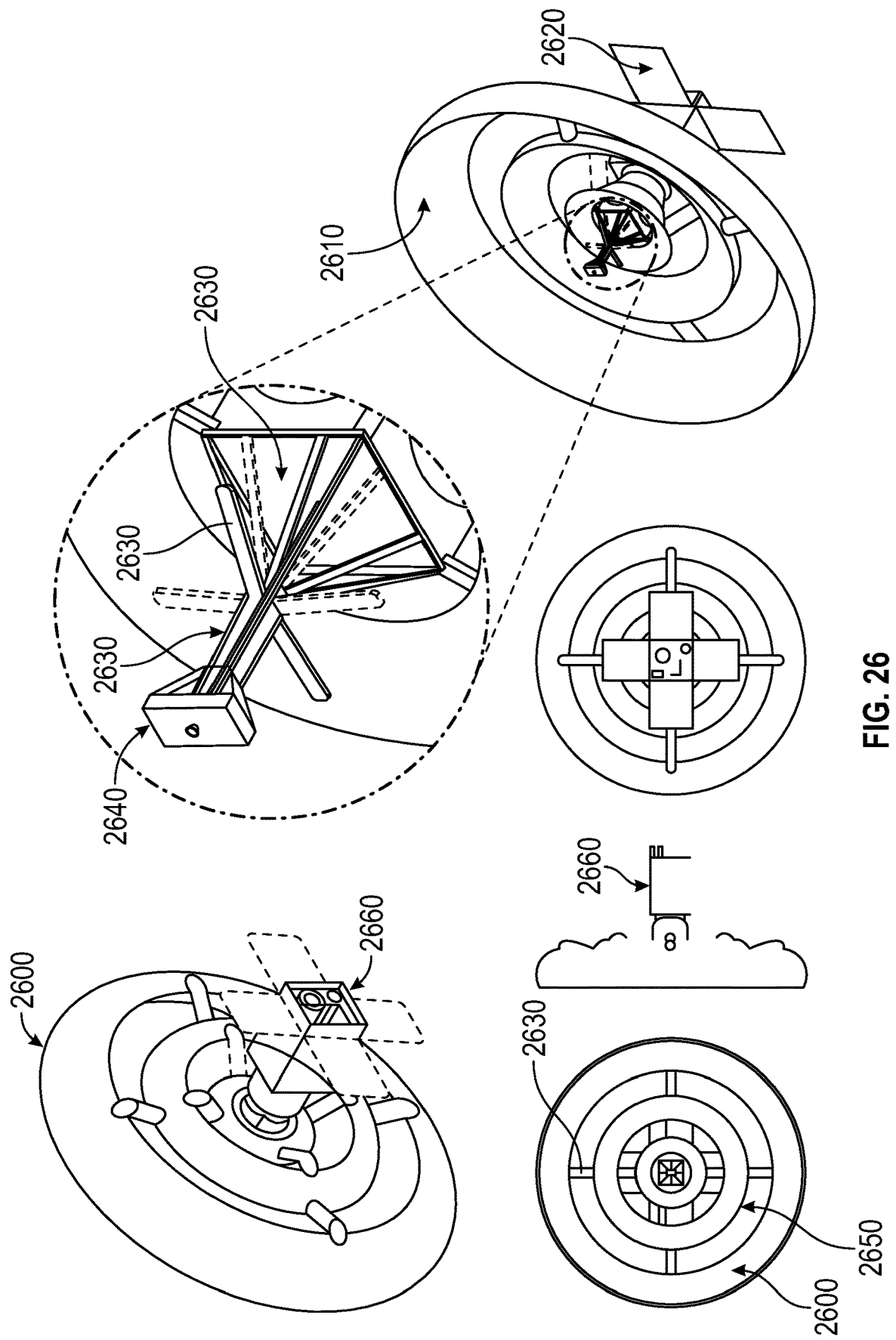
FIG. 26 shows a blueprint of a CubeSat scale of a ThermaSat Plus.

The inflatable solar concentrators of the ThermaSat Plus gathers more light than the regular ThermaSat by reflecting sunlight to the optical system/thermal capacitor. While the version in FIG. 19 is designed for small satellite use, FIG. 25 shows a ThermaSat Plus on a large scale ship. This version also has large solar collectors to gather more sunlight than would be possible using only the ThermaSat optical system. The larger collection area equates to higher input power than a system without these units. FIG. 26 shows a blueprint of a CubeSat scale ThermaSat Plus. FIG. 26 includes a deployable connector 2600 in various views with exemplary elements, including: a reflective side of the deployable connector at 2610, ancillary solar panels at 2620, support structure at 2630, a thermal capacitor and optical system at 2640, at least one gap at 2650, and an exemplary CubeSat payload at 2660.

The ThermaSat Plus design provides several improvements over the ThermaSat system, but, in at least one embodiment, uses the same phase change material thermal storage and optical system of the ThermaSat System. Additionally, the ThermaSat Plus adds solar collectors and uses hydrogen as propellant to increase performance above the ThermaSat System. In at least one embodiment, the ThermaSat Plus uses reflective mirrors for solar collectors and boron for the phase change materials, but could use lenses or semi-reflective surfaces for solar collectors. Additionally, the ThermaSat Plus can use molten salts, boron carbide, beryllium oxide, alumina, or other materials for the phase change materials.

In one preferred embodiment, the ThermaSat Plus would use deployable silvered mirrors for the solar collector, which would beam sunlight through an optical filtration system comprised of a layer of photonic crystals, thus reflecting infrared light and absorbing shorter wavelength light. The thermal capacitor would be comprised of an elemental boron phase change material contained in a tungsten/rhenium matrix. The thermal capacitor would contain flowchannels and would be prismatic in nature (i.e., for example a hexagonal cross section of material with flowchannels running axially, see FIG. 27 for an exemplary thermal capacitor 2700, which is shown including a prismatic core with flow channels at 2710, the flow channels through the prismatic core at 2740, stacked core sections at 2720, and a prismatic cermet core without flow channels at 2730). The operational temperature near 2500K would correspond to the melting point of elemental boron. It would use hydrogen as propellant. The ThermaSat Plus using this configuration would achieve a specific impulse near 850 seconds. Conversely, a traditional ThermaSat system unit without concentrators but which used water as propellant would have a specific impulse of around 200 seconds.

In at least one aspect, a propulsion system is provided with the propulsion system including an optical transmission system comprising at least two layers with the two layers comprising: selective transmitters, at least one transmitter and at least one absorber, or selective absorbers; a thermal capacitor for storing absorbed heat from light which passes through the optical transmission system; wherein the layers of selective absorbers prevent long wavelengths of light from passing through the boundary while allowing shorter wavelengths to pass through.

In one aspect, the propulsion system can include multiple transmitters, a transmitter and an absorber, or multiple absorbers. Further, the layers of selective absorbers of the propulsion system can raise heating higher temperatures higher than possible without the optical transmission system. Even further, water or other propellant can be heated to create propulsion. In at least one embodiment, the selective absorber is photonic crystals. In at least one embodiment, one of the at least two mirrors is a gold mirror and an other of the at least two mirrors is a hot mirror. In at least one embodiment, the propulsion system further comprises a thruster mount spaced to interact with the structure. In at least one embodiment, phase change materials are used for space propulsion by collecting heat over a period of time and releasing the heat into a propellant in a shorter period of time. In at least one embodiment, the maximum operational power level per unit area of solar collector increases beyond that of the natural solar irradiance levels at a given point in space. In at least one embodiment, the system is used for thermal rocket propulsion. In at least one embodiment, selective transmitters or selective absorbers are selective emitters that increase temperatures of components, including those used in space, on other planets, or in a vacuum. In at least one embodiment, wherein the system stores solar energy in a phase change material for propulsion. In at least one embodiment, the system uses a phase change material coupled with a radiative heat transfer system. In at least one embodiment, the radiative heat transfer system increases the temperature of the phase change material beyond its natural equilibrium.

In another embodiment, a propulsion system is provided that comprises a plurality of modular sections, with the plurality of modular sections including a thermal capacitor and optical system, a liquid storage tank, and intermediate pressure tanks. In at least one embodiment, the propulsion system further comprises additional subsystems. In at least one embodiment, the propulsion system comprises an optical transmission system including at least two layers with the two layers comprising: selective transmitters, at least one transmitter and at least one absorber, or selective absorbers; a thermal capacitor for storing absorbed heat from light which passes through the optical transmission system; and wherein the layers of selective absorbers prevent long wavelengths of light from passing through the boundary while allowing shorter wavelengths to pass through. In at least one embodiment, the layers of selective absorbers raise heating higher temperatures higher than possible without the optical transmission system. In at least one embodiment, water or other propellant is heated to create propulsion. In at least one embodiment, the system stores solar energy in a phase change material for propulsion. In at least one embodiment, the system uses a phase change material coupled with a radiative heat transfer system.

It will be appreciated by those skilled in the art that changes could be made to the embodiments described above without departing from the broad inventive concept thereof. For example, the valve, motor, microcomputer, or flow meter could include additional features. It is understood, therefore, that this disclosure is not limited to the particular embodiments disclosed, but it is intended to cover modifications within the spirit and scope of the present disclosure as defined by the appended claims.

The present disclosure can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description is provided as an enabling teaching of the disclosure in its best, currently known aspect. Those skilled in the relevant art will recognize that many changes can be made to the aspects described, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A propulsion system comprising:
   an optical transmission system comprising at least two layers with the at least two layers comprising:
   selective transmitters, at least one selective transmitter and at least one selective absorber, or selective absorbers;
   a solar concentrator; and,
   a thermal capacitor for storing absorbed heat from light which passes through the optical transmission system;
   wherein the at least two layers prevent long wavelengths of light from passing through the optical transmission system while allowing shorter wavelengths to pass through the optical transmission system.

2. The propulsion system of claim 1 wherein the at least two layers raise temperature higher than without the optical transmission system.

3. The propulsion system of claim 1 wherein water or other propellant is heated to create propulsion.

4. The propulsion system of claim 1 wherein the at least two layers are photonic crystals.

5. The propulsion system of claim 1 further comprising at least two mirrors wherein one of the at least two mirrors is a gold mirror and an other of the at least two mirrors is a hot mirror.

6. The propulsion system of claim 1 further comprising a thruster mount spaced to interact with the structure.

7. The propulsion system of claim 1 wherein phase change materials are used for space propulsion by collecting heat over a period of time and releasing the heat into a propellant in a shorter period of time.

8. The propulsion system of claim 1 wherein the maximum operational power level per unit area of solar collector increases beyond that of the natural solar irradiance levels at a given point in space.

9. The propulsion system of claim 1 wherein the system is used for thermal rocket propulsion.

10. The propulsion system of claim 1 wherein the at least two layers are selective emitters that increase temperature of components, including those used in space, on other planets, or in a vacuum.

11. The propulsion system of claim 1 wherein the propulsion system stores solar energy in a phase change material for propulsion.

12. The propulsion system of claim 1 wherein the propulsion system uses a phase change material coupled with a radiative heat transfer system.

13. The propulsion system of claim 12 wherein the radiative heat transfer system increases the temperature of the phase change material.

14. The propulsion system of claim 1 wherein the solar concentrator is reflective to infrared, visible, and ultraviolet, wavelengths of light.

15. The propulsion system of claim 1 wherein the solar concentrator is reflective to visible and ultraviolet wavelengths of light.

* * * * *